(12) United States Patent
Kim et al.

(10) Patent No.: US 11,323,908 B2
(45) Date of Patent: *May 3, 2022

(54) METHOD OF ALLOCATING CSI-RS FOR BEAM MANAGEMENT

(71) Applicant: Samsung Electronics Co., Ltd., Suwon-si (KR)

(72) Inventors: Jaewon Kim, Seoul (KR); Hyunkyu Yu, Suwon-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

This patent is subject to a terminal disclaimer.

(21) Appl. No.: 16/911,842

(22) Filed: Jun. 25, 2020

(65) Prior Publication Data

US 2020/0329396 A1 Oct. 15, 2020

Related U.S. Application Data

(63) Continuation of application No. 15/934,490, filed on Mar. 23, 2018, now Pat. No. 10,701,580.

(30) Foreign Application Priority Data

Mar. 23, 2017 (KR) .................. 10-2017-0037155
May 4, 2017 (KR) .................. 10-2017-0057055
Aug. 10, 2017 (KR) .................. 10-2017-0101585

(51) Int. Cl.
*H04W 24/10* (2009.01)
*H04W 72/04* (2009.01)
(Continued)

(52) U.S. Cl.
CPC .............. *H04W 24/10* (2013.01); *H04B 7/00* (2013.01); *H04B 7/0632* (2013.01); *H04B 7/0695* (2013.01); *H04W 72/046* (2013.01)

(58) Field of Classification Search
CPC ...... H04B 7/00; H04B 7/0632; H04B 7/0695; H04W 24/10; H04W 72/046
See application file for complete search history.

(56) References Cited

U.S. PATENT DOCUMENTS 10,701,580 B2 * 6/2020 Kim ................. H04B 7/0695
2017/0026938 A1 1/2017 Onggosanusi et al.
(Continued)

FOREIGN PATENT DOCUMENTS

KR 10-2015-0018170 A 2/2015
KR 10-2017-0112897 A 10/2017
(Continued)

OTHER PUBLICATIONS

LG Electronics et al., 'WF on DL beam management framework', R1-1701480, 3GPP TSG RAN1 NR Ad-Hoc, Spokane, USA, Jan. 20, 2017.
(Continued)

*Primary Examiner* — Kashif Siddiqui
(74) *Attorney, Agent, or Firm* — Jefferson IP Law, LLP

(57) ABSTRACT

The disclosure relates to a communication technique of fusing a fifth generation (5G) communication system for supporting higher data transmission rate beyond a fourth generation (4G) system with an Internet of things (IoT) technology and a system thereof. The disclosure may be applied to intelligent services (e.g., a smart home, a smart building, a smart city, a smart car or a connected car, health care, digital education, a retail business, security and safety
(Continued)

related service, or the like) based on the 5G communication technology and the IoT related technology. The present disclosure relates to a method and apparatus for searching for or determining information on a beam that a UE or a base station can use for signal transmission and reception in a mobile communication system.

20 Claims, 41 Drawing Sheets

(51) Int. Cl.
*H04B 7/06* (2006.01)
*H04B 7/00* (2006.01)

(56) References Cited

U.S. PATENT DOCUMENTS

| | | | |
|---|---|---|---|
| 2017/0047976 A1 | 2/2017 | Noh et al. | |
| 2018/0145809 A1 | 5/2018 | Kwak et al. | |
| 2018/0145818 A1 | 5/2018 | Choi et al. | |
| 2018/0234959 A1* | 8/2018 | Ahn | H04W 72/042 |
| 2018/0262251 A1 | 9/2018 | Kim et al. | |
| 2018/0279218 A1* | 9/2018 | Park | H04W 36/08 |
| 2018/0343595 A1* | 11/2018 | da Silva | H04L 5/005 |
| 2019/0116594 A1 | 4/2019 | Kwak et al. | |
| 2019/0268114 A1* | 8/2019 | Kang | H04B 7/06 |
| 2019/0312668 A1* | 10/2019 | Park | H04L 5/00 |

FOREIGN PATENT DOCUMENTS

| | | |
|---|---|---|
| KR | 10-2017-0113015 A | 10/2017 |
| KR | 10-2018-0057467 A | 5/2018 |
| KR | 10-2018-0057485 A | 5/2018 |
| WO | 2016/121537 A1 | 8/2016 |
| WO | 2017/014572 A1 | 1/2017 |
| WO | 2017-043834 A1 | 3/2017 |

OTHER PUBLICATIONS

NTT DOCOMO, Inc., 'Workplan for Study on NR Access Technology', R1-1702795, 3GPP TSG RAN WG1 Meeting #88, Athens, Greece, Feb. 7, 2017.
ZTE et al., 'On RS and CSI report settings', R1-1700128, 3GPP TSG RAN WG1 NR Ad-Hoc Meeting, Spokane, USA, Jan. 10, 2017.
A Notification of a Decision to Grant dated Jan. 5, 2022, issued in a counterpart Korean Application No. 10-2017-0101585.
Indian Office Action dated Jan. 25, 2022, issued in a counterpart Indian Application No. 201937037932.

* cited by examiner

FIG. 5

| Resource set 0 | | Resource set 1 | | Resource set 2 | | Resource set 3 | |
|---|---|---|---|---|---|---|---|
| Rsc 0 | Rsc 8 | Rsc 0 | Rsc 8 | Rsc 0 | Rsc 8 | Rsc 0 | Rsc 8 |
| Rsc 1 | Rsc 9 | Rsc 1 | Rsc 9 | Rsc 1 | Rsc 9 | Rsc 1 | Rsc 9 |
| Rsc 2 | Rsc 10 | Rsc 2 | Rsc 10 | Rsc 2 | Rsc 10 | Rsc 2 | Rsc 10 |
| Rsc 3 | Rsc 11 | Rsc 3 | Rsc 11 | Rsc 3 | Rsc 11 | Rsc 3 | Rsc 11 |
| Rsc 4 | Rsc 12 | Rsc 4 | Rsc 12 | Rsc 4 | Rsc 12 | Rsc 4 | Rsc 12 |
| Rsc 5 | Rsc 13 | Rsc 5 | Rsc 13 | Rsc 5 | Rsc 13 | Rsc 5 | Rsc 13 |
| Rsc 6 | Rsc 14 | Rsc 6 | Rsc 14 | Rsc 6 | Rsc 14 | Rsc 6 | Rsc 14 |
| Rsc 7 | Rsc 15 | Rsc 7 | Rsc 15 | Rsc 7 | Rsc 15 | Rsc 7 | Rsc 15 |
| Rsc 0 | Rsc 8 | Rsc 0 | Rsc 8 | Rsc 0 | Rsc 8 | Rsc 0 | Rsc 8 |
| Rsc 1 | Rsc 9 | Rsc 1 | Rsc 9 | Rsc 1 | Rsc 9 | Rsc 1 | Rsc 9 |
| Rsc 2 | Rsc 10 | Rsc 2 | Rsc 10 | Rsc 2 | Rsc 10 | Rsc 2 | Rsc 10 |
| Rsc 3 | Rsc 11 | Rsc 3 | Rsc 11 | Rsc 3 | Rsc 11 | Rsc 3 | Rsc 11 |
| Rsc 4 | Rsc 12 | Rsc 4 | Rsc 12 | Rsc 4 | Rsc 12 | Rsc 4 | Rsc 12 |
| Rsc 5 | Rsc 13 | Rsc 5 | Rsc 13 | Rsc 5 | Rsc 13 | Rsc 5 | Rsc 13 |
| Rsc 6 | Rsc 14 | Rsc 6 | Rsc 14 | Rsc 6 | Rsc 14 | Rsc 6 | Rsc 14 |
| Rsc 7 | Rsc 15 | Rsc 7 | Rsc 15 | Rsc 7 | Rsc 15 | Rsc 7 | Rsc 15 |
| | | | | | | | |
| ⋮ | ⋮ | ⋮ | ⋮ | ⋮ | ⋮ | ⋮ | ⋮ |
| | | | | | | | |
| Rsc 0 | Rsc 8 | Rsc 0 | Rsc 8 | Rsc 0 | Rsc 8 | Rsc 0 | Rsc 8 |
| Rsc 1 | Rsc 9 | Rsc 1 | Rsc 9 | Rsc 1 | Rsc 9 | Rsc 1 | Rsc 9 |
| Rsc 2 | Rsc 10 | Rsc 2 | Rsc 10 | Rsc 2 | Rsc 10 | Rsc 2 | Rsc 10 |
| Rsc 3 | Rsc 11 | Rsc 3 | Rsc 11 | Rsc 3 | Rsc 11 | Rsc 3 | Rsc 11 |
| Rsc 4 | Rsc 12 | Rsc 4 | Rsc 12 | Rsc 4 | Rsc 12 | Rsc 4 | Rsc 12 |
| Rsc 5 | Rsc 13 | Rsc 5 | Rsc 13 | Rsc 5 | Rsc 13 | Rsc 5 | Rsc 13 |
| Rsc 6 | Rsc 14 | Rsc 6 | Rsc 14 | Rsc 6 | Rsc 14 | Rsc 6 | Rsc 14 |
| Rsc 7 | Rsc 15 | Rsc 7 | Rsc 15 | Rsc 7 | Rsc 15 | Rsc 7 | Rsc 15 |
| Rsc 0 | Rsc 8 | Rsc 0 | Rsc 8 | Rsc 0 | Rsc 8 | Rsc 0 | Rsc 8 |
| Rsc 1 | Rsc 9 | Rsc 1 | Rsc 9 | Rsc 1 | Rsc 9 | Rsc 1 | Rsc 9 |
| Rsc 2 | Rsc 10 | Rsc 2 | Rsc 10 | Rsc 2 | Rsc 10 | Rsc 2 | Rsc 10 |
| Rsc 3 | Rsc 11 | Rsc 3 | Rsc 11 | Rsc 3 | Rsc 11 | Rsc 3 | Rsc 11 |
| Rsc 4 | Rsc 12 | Rsc 4 | Rsc 12 | Rsc 4 | Rsc 12 | Rsc 4 | Rsc 12 |
| Rsc 5 | Rsc 13 | Rsc 5 | Rsc 13 | Rsc 5 | Rsc 13 | Rsc 5 | Rsc 13 |
| Rsc 6 | Rsc 14 | Rsc 6 | Rsc 14 | Rsc 6 | Rsc 14 | Rsc 6 | Rsc 14 |
| Rsc 7 | Rsc 15 | Rsc 7 | Rsc 15 | Rsc 7 | Rsc 15 | Rsc 7 | Rsc 15 |

System bandwidth

| | Resource set 0 | | | Resource set 1 | | | Resource set 0 (repeatition) | | | Resource set 1 (repeatition) | |
|---|---|---|---|---|---|---|---|---|---|---|---|
| ... | Rsc 0 (AP 0) | Rsc 4 (AP 0) | Rsc 8 (AP 0) | Rsc 12 (AP 0) | Rsc 0 (AP 0) | Rsc 4 (AP 0) | Rsc 8 (AP 0) | Rsc 12 (AP 0) | Rsc 0 (AP 0) | Rsc 4 (AP 0) | Rsc 8 (AP 0) | Rsc 12 (AP 0) |
| ... | Rsc 0 (AP 1) | Rsc 4 (AP 1) | Rsc 8 (AP 1) | Rsc 12 (AP 1) | Rsc 0 (AP 1) | Rsc 4 (AP 1) | Rsc 8 (AP 1) | Rsc 12 (AP 1) | Rsc 0 (AP 1) | Rsc 4 (AP 1) | Rsc 8 (AP 1) | Rsc 12 (AP 1) |
| ... | Rsc 1 (AP 0) | Rsc 5 (AP 0) | Rsc 9 (AP 0) | Rsc 13 (AP 0) | Rsc 1 (AP 0) | Rsc 5 (AP 0) | Rsc 9 (AP 0) | Rsc 13 (AP 0) | Rsc 1 (AP 0) | Rsc 5 (AP 0) | Rsc 9 (AP 0) | Rsc 13 (AP 0) |
| ... | Rsc 1 (AP 1) | Rsc 5 (AP 1) | Rsc 9 (AP 1) | Rsc 13 (AP 1) | Rsc 1 (AP 1) | Rsc 5 (AP 1) | Rsc 9 (AP 1) | Rsc 13 (AP 1) | Rsc 1 (AP 1) | Rsc 5 (AP 1) | Rsc 9 (AP 1) | Rsc 13 (AP 1) |
| ... | Rsc 2 (AP 0) | Rsc 6 (AP 0) | Rsc 10 (AP 0) | Rsc 14 (AP 0) | Rsc 2 (AP 0) | Rsc 6 (AP 0) | Rsc 10 (AP 0) | Rsc 14 (AP 0) | Rsc 2 (AP 0) | Rsc 6 (AP 0) | Rsc 10 (AP 0) | Rsc 14 (AP 0) |
| ... | Rsc 2 (AP 1) | Rsc 6 (AP 1) | Rsc 10 (AP 1) | Rsc 14 (AP 1) | Rsc 2 (AP 1) | Rsc 6 (AP 1) | Rsc 10 (AP 1) | Rsc 14 (AP 1) | Rsc 2 (AP 1) | Rsc 6 (AP 1) | Rsc 10 (AP 1) | Rsc 14 (AP 1) |
| ... | Rsc 3 (AP 0) | Rsc 7 (AP 0) | Rsc 11 (AP 0) | Rsc 15 (AP 0) | Rsc 3 (AP 0) | Rsc 7 (AP 0) | Rsc 11 (AP 0) | Rsc 15 (AP 0) | Rsc 3 (AP 0) | Rsc 7 (AP 0) | Rsc 11 (AP 0) | Rsc 15 (AP 0) |
| ... | Rsc 3 (AP 1) | Rsc 7 (AP 1) | Rsc 11 (AP 1) | Rsc 15 (AP 1) | Rsc 3 (AP 1) | Rsc 7 (AP 1) | Rsc 11 (AP 1) | Rsc 15 (AP 1) | Rsc 3 (AP 1) | Rsc 7 (AP 1) | Rsc 11 (AP 1) | Rsc 15 (AP 1) |

1/60 ms 4 symbol apart

FIG. 11B

| | Set 0 | Set 1 | Set 2 | Set 3 |
|---|---|---|---|---|
| ↑ | Rsc 0, Port 0 | Rsc 0, Port 0 | Rsc 0, Port 0 | Rsc 0, Port 0 |
| | Rsc 0, Port 1 | Rsc 0, Port 1 | Rsc 0, Port 1 | Rsc 0, Port 1 |
| | Rsc 1, Port 0 | Rsc 1, Port 0 | Rsc 1, Port 0 | Rsc 1, Port 0 |
| | Rsc 1, Port 1 | Rsc 1, Port 1 | Rsc 1, Port 1 | Rsc 1, Port 1 |
| | Rsc 2, Port 0 | Rsc 2, Port 0 | Rsc 2, Port 0 | Rsc 2, Port 0 |
| | Rsc 2, Port 1 | Rsc 2, Port 1 | Rsc 2, Port 1 | Rsc 2, Port 1 |
| | Rsc 3, Port 0 | Rsc 3, Port 0 | Rsc 3, Port 0 | Rsc 3, Port 0 |
| | Rsc 3, Port 1 | Rsc 3, Port 1 | Rsc 3, Port 1 | Rsc 3, Port 1 |
| | Rsc 0, Port 0 | Rsc 0, Port 0 | Rsc 0, Port 0 | Rsc 0, Port 0 |
| | Rsc 0, Port 1 | Rsc 0, Port 1 | Rsc 0, Port 1 | Rsc 0, Port 1 |
| | Rsc 1, Port 0 | Rsc 1, Port 0 | Rsc 1, Port 0 | Rsc 1, Port 0 |
| | Rsc 1, Port 1 | Rsc 1, Port 1 | Rsc 1, Port 1 | Rsc 1, Port 1 |
| Configured CSI-RS BW | Rsc 2, Port 0 | Rsc 2, Port 0 | Rsc 2, Port 0 | Rsc 2, Port 0 |
| | Rsc 2, Port 1 | Rsc 2, Port 1 | Rsc 2, Port 1 | Rsc 2, Port 1 |
| | Rsc 3, Port 0 | Rsc 3, Port 0 | Rsc 3, Port 0 | Rsc 3, Port 0 |
| | Rsc 3, Port 1 | Rsc 3, Port 1 | Rsc 3, Port 1 | Rsc 3, Port 1 |
| | | | | |
| | | | | |
| | | | | |
| | Rsc 0, Port 0 | Rsc 0, Port 0 | Rsc 0, Port 0 | Rsc 0, Port 0 |
| | Rsc 0, Port 1 | Rsc 0, Port 1 | Rsc 0, Port 1 | Rsc 0, Port 1 |
| | Rsc 1, Port 0 | Rsc 1, Port 0 | Rsc 1, Port 0 | Rsc 1, Port 0 |
| | Rsc 1, Port 1 | Rsc 1, Port 1 | Rsc 1, Port 1 | Rsc 1, Port 1 |
| | Rsc 2, Port 0 | Rsc 2, Port 0 | Rsc 2, Port 0 | Rsc 2, Port 0 |
| | Rsc 2, Port 1 | Rsc 2, Port 1 | Rsc 2, Port 1 | Rsc 2, Port 1 |
| | Rsc 3, Port 0 | Rsc 3, Port 0 | Rsc 3, Port 0 | Rsc 3, Port 0 |
| | Rsc 3, Port 1 | Rsc 3, Port 1 | Rsc 3, Port 1 | Rsc 3, Port 1 |
| | Rsc 0, Port 0 | Rsc 0, Port 0 | Rsc 0, Port 0 | Rsc 0, Port 0 |
| | Rsc 0, Port 1 | Rsc 0, Port 1 | Rsc 0, Port 1 | Rsc 0, Port 1 |
| | Rsc 1, Port 0 | Rsc 1, Port 0 | Rsc 1, Port 0 | Rsc 1, Port 0 |
| | Rsc 1, Port 1 | Rsc 1, Port 1 | Rsc 1, Port 1 | Rsc 1, Port 1 |
| | Rsc 2, Port 0 | Rsc 2, Port 0 | Rsc 2, Port 0 | Rsc 2, Port 0 |
| | Rsc 2, Port 1 | Rsc 2, Port 1 | Rsc 2, Port 1 | Rsc 2, Port 1 |
| | Rsc 3, Port 0 | Rsc 3, Port 0 | Rsc 3, Port 0 | Rsc 3, Port 0 |
| ↓ | Rsc 3, Port 1 | Rsc 3, Port 1 | Rsc 3, Port 1 | Rsc 3, Port 1 |

| Set 0 | Set 1 | Combined |
|---|---|---|
| Rsc 0 | Shift 2 REs | Rsc 0 |
| Gap 2 REs | Rsc 0 | Rsc 0 |
| Rsc 1 | Gap 2 REs | Rsc 1 |
| Gap 2 REs | Rsc 1 | Rsc 1 |
| Rsc 2 | Gap 2 REs | Rsc 2 |
| Gap 2 REs | Rsc 2 | Rsc 2 |
| Rsc 3 | Gap 2 REs | Rsc 3 |
| Gap 2 REs | Rsc 3 | Rsc 3 |
| Rsc 0 | Gap 2 REs | Rsc 0 |
| Gap 2 REs | Rsc 0 | Rsc 0 |
| Rsc 1 | Gap 2 REs | Rsc 1 |
| Gap 2 REs | Rsc 1 | Rsc 1 |
| Rsc 2 | Gap 2 REs | Rsc 2 |
| Gap 2 REs | Rsc 2 | Rsc 2 |
| Rsc 3 | Gap 2 REs | Rsc 3 |
| Gap 2 REs | Rsc 3 | Rsc 3 |

FIG. 16
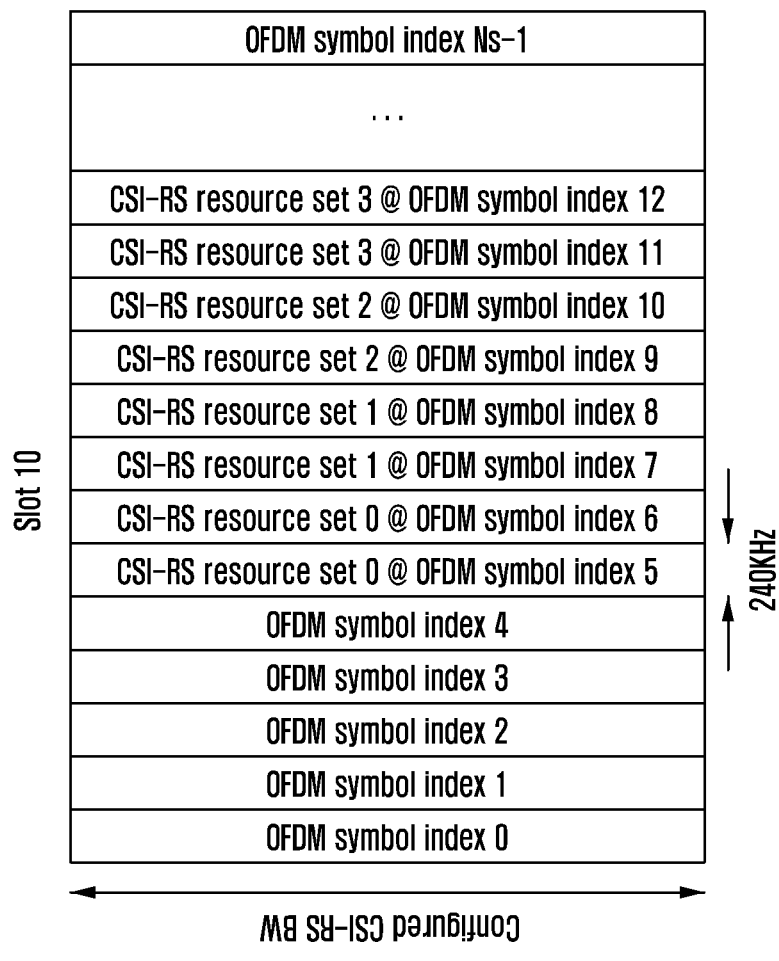
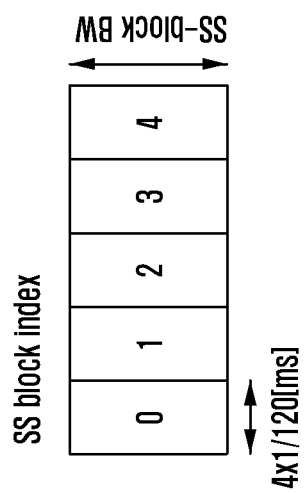

FIG. 17

| Resource set 0 | | Resource set 1 | | Resource set 2 | | Resource set 3 | | |
|---|---|---|---|---|---|---|---|---|
| Rsc 0 | Rsc 8 | Rsc 0 | Rsc 8 | Rsc 0 | Rsc 8 | Rsc 0 | Rsc 8 | ▲ |
| Rsc 1 | Rsc 9 | Rsc 1 | Rsc 9 | Rsc 1 | Rsc 9 | Rsc 1 | Rsc 9 | |
| Rsc 2 | Rsc 10 | Rsc 2 | Rsc 10 | Rsc 2 | Rsc 10 | Rsc 2 | Rsc 10 | |
| Rsc 3 | Rsc 11 | Rsc 3 | Rsc 11 | Rsc 3 | Rsc 11 | Rsc 3 | Rsc 11 | |
| Rsc 4 | Rsc 12 | Rsc 4 | Rsc 12 | Rsc 4 | Rsc 12 | Rsc 4 | Rsc 12 | |
| Rsc 5 | Rsc 13 | Rsc 5 | Rsc 13 | Rsc 5 | Rsc 13 | Rsc 5 | Rsc 13 | |
| Rsc 6 | Rsc 14 | Rsc 6 | Rsc 14 | Rsc 6 | Rsc 14 | Rsc 6 | Rsc 14 | |
| Rsc 7 | Rsc 15 | Rsc 7 | Rsc 15 | Rsc 7 | Rsc 15 | Rsc 7 | Rsc 15 | |
| Rsc 0 | Rsc 8 | Rsc 0 | Rsc 8 | Rsc 0 | Rsc 8 | Rsc 0 | Rsc 8 | |
| Rsc 1 | Rsc 9 | Rsc 1 | Rsc 9 | Rsc 1 | Rsc 9 | Rsc 1 | Rsc 9 | |
| Rsc 2 | Rsc 10 | Rsc 2 | Rsc 10 | Rsc 2 | Rsc 10 | Rsc 2 | Rsc 10 | |
| Rsc 3 | Rsc 11 | Rsc 3 | Rsc 11 | Rsc 3 | Rsc 11 | Rsc 3 | Rsc 11 | |
| Rsc 4 | Rsc 12 | Rsc 4 | Rsc 12 | Rsc 4 | Rsc 12 | Rsc 4 | Rsc 12 | |
| Rsc 5 | Rsc 13 | Rsc 5 | Rsc 13 | Rsc 5 | Rsc 13 | Rsc 5 | Rsc 13 | |
| Rsc 6 | Rsc 14 | Rsc 6 | Rsc 14 | Rsc 6 | Rsc 14 | Rsc 6 | Rsc 14 | |
| Rsc 7 | Rsc 15 | Rsc 7 | Rsc 15 | Rsc 7 | Rsc 15 | Rsc 7 | Rsc 15 | |
| | | | | | | | | |
| ⋮ | ⋮ | ⋮ | ⋮ | ⋮ | ⋮ | ⋮ | ⋮ | Configured CSI-RS bandwitdh |
| | | | | | | | | |
| Rsc 0 | Rsc 8 | Rsc 0 | Rsc 8 | Rsc 0 | Rsc 8 | Rsc 0 | Rsc 8 | |
| Rsc 1 | Rsc 9 | Rsc 1 | Rsc 9 | Rsc 1 | Rsc 9 | Rsc 1 | Rsc 9 | |
| Rsc 2 | Rsc 10 | Rsc 2 | Rsc 10 | Rsc 2 | Rsc 10 | Rsc 2 | Rsc 10 | |
| Rsc 3 | Rsc 11 | Rsc 3 | Rsc 11 | Rsc 3 | Rsc 11 | Rsc 3 | Rsc 11 | |
| Rsc 4 | Rsc 12 | Rsc 4 | Rsc 12 | Rsc 4 | Rsc 12 | Rsc 4 | Rsc 12 | |
| Rsc 5 | Rsc 13 | Rsc 5 | Rsc 13 | Rsc 5 | Rsc 13 | Rsc 5 | Rsc 13 | |
| Rsc 6 | Rsc 14 | Rsc 6 | Rsc 14 | Rsc 6 | Rsc 14 | Rsc 6 | Rsc 14 | |
| Rsc 7 | Rsc 15 | Rsc 7 | Rsc 15 | Rsc 7 | Rsc 15 | Rsc 7 | Rsc 15 | |
| Rsc 0 | Rsc 8 | Rsc 0 | Rsc 8 | Rsc 0 | Rsc 8 | Rsc 0 | Rsc 8 | |
| Rsc 1 | Rsc 9 | Rsc 1 | Rsc 9 | Rsc 1 | Rsc 9 | Rsc 1 | Rsc 9 | |
| Rsc 2 | Rsc 10 | Rsc 2 | Rsc 10 | Rsc 2 | Rsc 10 | Rsc 2 | Rsc 10 | |
| Rsc 3 | Rsc 11 | Rsc 3 | Rsc 11 | Rsc 3 | Rsc 11 | Rsc 3 | Rsc 11 | |
| Rsc 4 | Rsc 12 | Rsc 4 | Rsc 12 | Rsc 4 | Rsc 12 | Rsc 4 | Rsc 12 | |
| Rsc 5 | Rsc 13 | Rsc 5 | Rsc 13 | Rsc 5 | Rsc 13 | Rsc 5 | Rsc 13 | |
| Rsc 6 | Rsc 14 | Rsc 6 | Rsc 14 | Rsc 6 | Rsc 14 | Rsc 6 | Rsc 14 | |
| Rsc 7 | Rsc 15 | Rsc 7 | Rsc 15 | Rsc 7 | Rsc 15 | Rsc 7 | Rsc 15 | ▼ |

| Resource set 0 | | Resource set 1 | | Resource set 2 | | Resource set 3 | | |
|---|---|---|---|---|---|---|---|---|
| Rsc 0 | Rsc 0 | Rsc 0 | Rsc 0 | Rsc 0 | Rsc 0 | Rsc 0 | Rsc 0 | ▲ |
| Rsc 1 | Rsc 1 | Rsc 1 | Rsc 1 | Rsc 1 | Rsc 1 | Rsc 1 | Rsc 1 | |
| Rsc 2 | Rsc 2 | Rsc 2 | Rsc 2 | Rsc 2 | Rsc 2 | Rsc 2 | Rsc 2 | |
| Rsc 3 | Rsc 3 | Rsc 3 | Rsc 3 | Rsc 3 | Rsc 3 | Rsc 3 | Rsc 3 | |
| Rsc 4 | Rsc 4 | Rsc 4 | Rsc 4 | Rsc 4 | Rsc 4 | Rsc 4 | Rsc 4 | |
| Rsc 5 | Rsc 5 | Rsc 5 | Rsc 5 | Rsc 5 | Rsc 5 | Rsc 5 | Rsc 5 | |
| Rsc 6 | Rsc 6 | Rsc 6 | Rsc 6 | Rsc 6 | Rsc 6 | Rsc 6 | Rsc 6 | |
| Rsc 7 | Rsc 7 | Rsc 7 | Rsc 7 | Rsc 7 | Rsc 7 | Rsc 7 | Rsc 7 | |
| Rsc 0 | Rsc 0 | Rsc 0 | Rsc 0 | Rsc 0 | Rsc 0 | Rsc 0 | Rsc 0 | |
| Rsc 1 | Rsc 1 | Rsc 1 | Rsc 1 | Rsc 1 | Rsc 1 | Rsc 1 | Rsc 1 | |
| Rsc 2 | Rsc 2 | Rsc 2 | Rsc 2 | Rsc 2 | Rsc 2 | Rsc 2 | Rsc 2 | |
| Rsc 3 | Rsc 3 | Rsc 3 | Rsc 3 | Rsc 3 | Rsc 3 | Rsc 3 | Rsc 3 | |
| Rsc 4 | Rsc 4 | Rsc 4 | Rsc 4 | Rsc 4 | Rsc 4 | Rsc 4 | Rsc 4 | |
| Rsc 5 | Rsc 5 | Rsc 5 | Rsc 5 | Rsc 5 | Rsc 5 | Rsc 5 | Rsc 5 | Configured CSI-RS bandwitdh |
| Rsc 6 | Rsc 6 | Rsc 6 | Rsc 6 | Rsc 6 | Rsc 6 | Rsc 6 | Rsc 6 | |
| Rsc 7 | Rsc 7 | Rsc 7 | Rsc 7 | Rsc 7 | Rsc 7 | Rsc 7 | Rsc 7 | |
| | | | | | | | | |
| | | | | | | | | |
| | | | | | | | | |
| Rsc 0 | Rsc 0 | Rsc 0 | Rsc 0 | Rsc 0 | Rsc 0 | Rsc 0 | Rsc 0 | |
| Rsc 1 | Rsc 1 | Rsc 1 | Rsc 1 | Rsc 1 | Rsc 1 | Rsc 1 | Rsc 1 | |
| Rsc 2 | Rsc 2 | Rsc 2 | Rsc 2 | Rsc 2 | Rsc 2 | Rsc 2 | Rsc 2 | |
| Rsc 3 | Rsc 3 | Rsc 3 | Rsc 3 | Rsc 3 | Rsc 3 | Rsc 3 | Rsc 3 | |
| Rsc 4 | Rsc 4 | Rsc 4 | Rsc 4 | Rsc 4 | Rsc 4 | Rsc 4 | Rsc 4 | |
| Rsc 5 | Rsc 5 | Rsc 5 | Rsc 5 | Rsc 5 | Rsc 5 | Rsc 5 | Rsc 5 | |
| Rsc 6 | Rsc 6 | Rsc 6 | Rsc 6 | Rsc 6 | Rsc 6 | Rsc 6 | Rsc 6 | |
| Rsc 7 | Rsc 7 | Rsc 7 | Rsc 7 | Rsc 7 | Rsc 7 | Rsc 7 | Rsc 7 | |
| Rsc 0 | Rsc 0 | Rsc 0 | Rsc 0 | Rsc 0 | Rsc 0 | Rsc 0 | Rsc 0 | |
| Rsc 1 | Rsc 1 | Rsc 1 | Rsc 1 | Rsc 1 | Rsc 1 | Rsc 1 | Rsc 1 | |
| Rsc 2 | Rsc 2 | Rsc 2 | Rsc 2 | Rsc 2 | Rsc 2 | Rsc 2 | Rsc 2 | |
| Rsc 3 | Rsc 3 | Rsc 3 | Rsc 3 | Rsc 3 | Rsc 3 | Rsc 3 | Rsc 3 | |
| Rsc 4 | Rsc 4 | Rsc 4 | Rsc 4 | Rsc 4 | Rsc 4 | Rsc 4 | Rsc 4 | |
| Rsc 5 | Rsc 5 | Rsc 5 | Rsc 5 | Rsc 5 | Rsc 5 | Rsc 5 | Rsc 5 | |
| Rsc 6 | Rsc 6 | Rsc 6 | Rsc 6 | Rsc 6 | Rsc 6 | Rsc 6 | Rsc 6 | |
| Rsc 7 | Rsc 7 | Rsc 7 | Rsc 7 | Rsc 7 | Rsc 7 | Rsc 7 | Rsc 7 | ▼ |

| RE index | Set Index | Resource index (k) | Port 0 | Port 1 |
|---|---|---|---|---|
| 0 | 0 | 0 | $X_0$ | $Y_0$ |
| 1 | | | | |
| 2 | | 1 | $X_1$ | $Y_1$ |
| 3 | | | | |
| 4 | | 2 | $X_2$ | $Y_2$ |
| 5 | | | | |
| 6 | | 3 | $X_3$ | $Y_3$ |
| 7 | | | | |
| 8 | | 0 | $X_0$ | $Y_0$ |
| 9 | | | | |
| 10 | | 1 | $X_1$ | $Y_1$ |
| 11 | | | | |
| 12 | | 2 | $X_2$ | $Y_2$ |
| 13 | | | | |
| 14 | | 3 | $X_3$ | $Y_3$ |
| 15 | | | | |
| 16 | | 0 | $X_0$ | $Y_0$ |
| 17 | | | | |
| 18 | | 1 | $X_1$ | $Y_1$ |
| 19 | | | | |
| 20 | | 2 | $X_2$ | $Y_2$ |
| 21 | | | | |
| 22 | | 3 | $X_3$ | $Y_3$ |
| 23 | | | | |

FIG. 20

| RE index | Set Index | Resource index (k) | Port 0 | Port 1 |
|---|---|---|---|---|
| 0 | 0 | k=0, 1, 2, 3 | $X_k$ | $Y_k$ |
| 1 | | | | |
| 2 | | | | |
| 3 | | | | |
| 4 | | | | |
| 5 | | | | |
| 6 | | | | |
| 7 | | | | |
| 8 | | k=0, 1, 2, 3 | $X_k$ | $Y_k$ |
| 9 | | | | |
| 10 | | | | |
| 11 | | | | |
| 12 | | | | |
| 13 | | | | |
| 14 | | | | |
| 15 | | | | |
| 16 | | k=0, 1, 2, 3 | $X_k$ | $Y_k$ |
| 17 | | | | |
| 18 | | | | |
| 19 | | | | |
| 20 | | | | |
| 21 | | | | |
| 22 | | | | |
| 23 | | | | |

FIG. 21

| RE index | Set Index | Resource index (k) | Port 0 | Port 1 |
|---|---|---|---|---|
| 0 | 0 | 0 | $X_0$ | $Y_0$ |
| 1 | | | | |
| 2 | | 1 | $X_1$ | $Y_1$ |
| 3 | | | | |
| 4 | | 2 | $X_2$ | $Y_2$ |
| 5 | | | | |
| 6 | | 3 | $X_3$ | $Y_3$ |
| 7 | | | | |
| 8 | | 0 | $X_0$ | $Y_0$ |
| 9 | | | | |
| 10 | | 1 | $X_1$ | $Y_1$ |
| 11 | | | | |
| 12 | | 2 | $X_2$ | $Y_2$ |
| 13 | | | | |
| 14 | | 3 | $X_3$ | $Y_3$ |
| 15 | | | | |
| 16 | | 0 | $X_0$ | $Y_0$ |
| 17 | | | | |
| 18 | | 1 | $X_1$ | $Y_1$ |
| 19 | | | | |
| 20 | | 2 | $X_2$ | $Y_2$ |
| 21 | | | | |
| 22 | | 3 | $X_3$ | $Y_3$ |
| 23 | | | | |

FIG. 22

| RE index | Set Index | Resource index (k) | Port 0 | Port 1 |
|---|---|---|---|---|
| 0 | 0 | 0 | $X_0$ | $Y_0$ |
| 1 | | | | |
| 2 | 1 | 0 | $X_0$ | $Y_0$ |
| 3 | | | | |
| 4 | 0 | 1 | $X_1$ | $Y_1$ |
| 5 | | | | |
| 6 | 1 | 1 | $X_1$ | $Y_1$ |
| 7 | | | | |
| 8 | 0 | 2 | $X_2$ | $Y_2$ |
| 9 | | | | |
| 10 | 1 | 2 | $X_2$ | $Y_2$ |
| 11 | | | | |
| 12 | 0 | 3 | $X_3$ | $Y_3$ |
| 13 | | | | |
| 14 | 1 | 3 | $X_3$ | $Y_3$ |
| 15 | | | | |

FIG. 23

| RE index | Set Index | Resource index (k) | Port 0 | Port 1 |
|---|---|---|---|---|
| 0 | 0 | 0 | $X_0$ | $Y_0$ |
| 1 | | | | |
| 2 | | 1 | $X_1$ | $Y_1$ |
| 3 | | | | |
| 4 | | 2 | $X_2$ | $Y_2$ |
| 5 | | | | |
| 6 | | 3 | $X_3$ | $Y_3$ |
| 7 | | | | |
| 8 | 1 | 0 | $X_0$ | $Y_0$ |
| 9 | | | | |
| 10 | | 1 | $X_1$ | $Y_1$ |
| 11 | | | | |
| 12 | | 2 | $X_2$ | $Y_2$ |
| 13 | | | | |
| 14 | | 3 | $X_3$ | $Y_3$ |
| 15 | | | | |

FIG. 24

|  | set 0 | set 1 | set 2 | set 3 | set 4 | set 5 | set 6 | set 7 | set 8 | set 9 | set 10 | set 11 | set 12 | set 13 |
|---|---|---|---|---|---|---|---|---|---|---|---|---|---|---|
| | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 |
| | 2 | 2 | 2 | 2 | 2 | 2 | 2 | 2 | 2 | 2 | 2 | 2 | 2 | 2 |
| | 3 | 3 | 3 | 3 | 3 | 3 | 3 | 3 | 3 | 3 | 3 | 3 | 3 | 3 |
| | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 |
| | 2 | 2 | 2 | 2 | 2 | 2 | 2 | 2 | 2 | 2 | 2 | 2 | 2 | 2 |
| | 3 | 3 | 3 | 3 | 3 | 3 | 3 | 3 | 3 | 3 | 3 | 3 | 3 | 3 |
| | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 |
| | 2 | 2 | 2 | 2 | 2 | 2 | 2 | 2 | 2 | 2 | 2 | 2 | 2 | 2 |
| | 3 | 3 | 3 | 3 | 3 | 3 | 3 | 3 | 3 | 3 | 3 | 3 | 3 | 3 |

1 RB (=12 REs)

⋮

CSI-RS resources index {0,1,2,3} and resource set index {0,1, ..., 13}

FIG. 25

| | set 0 | set 1 | set 2 | set 3 | set 4 | set 5 | set 6 | set 7 | set 8 | set 9 | set 10 | set 11 | set 12 | set 13 |
|---|---|---|---|---|---|---|---|---|---|---|---|---|---|---|
| | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 |
| | 2 | 2 | 2 | 2 | 2 | 2 | 2 | 2 | 2 | 2 | 2 | 2 | 2 | 2 |
| | 3 | 3 | 3 | 3 | 3 | 3 | 3 | 3 | 3 | 3 | 3 | 3 | 3 | 3 |
| 1 RB (=12 REs) | 4 | 4 | 4 | 4 | 4 | 4 | 4 | 4 | 4 | 4 | 4 | 4 | 4 | 4 |
| | 5 | 5 | 5 | 5 | 5 | 5 | 5 | 5 | 5 | 5 | 5 | 5 | 5 | 5 |
| | 6 | 6 | 6 | 6 | 6 | 6 | 6 | 6 | 6 | 6 | 6 | 6 | 6 | 6 |
| | 7 | 7 | 7 | 7 | 7 | 7 | 7 | 7 | 7 | 7 | 7 | 7 | 7 | 7 |
| | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 |
| | 2 | 2 | 2 | 2 | 2 | 2 | 2 | 2 | 2 | 2 | 2 | 2 | 2 | 2 |
| | 3 | 3 | 3 | 3 | 3 | 3 | 3 | 3 | 3 | 3 | 3 | 3 | 3 | 3 |
| | 4 | 4 | 4 | 4 | 4 | 4 | 4 | 4 | 4 | 4 | 4 | 4 | 4 | 4 |
| | 5 | 5 | 5 | 5 | 5 | 5 | 5 | 5 | 5 | 5 | 5 | 5 | 5 | 5 |
| | 6 | 6 | 6 | 6 | 6 | 6 | 6 | 6 | 6 | 6 | 6 | 6 | 6 | 6 |
| | 7 | 7 | 7 | 7 | 7 | 7 | 7 | 7 | 7 | 7 | 7 | 7 | 7 | 7 |

⋮

CSI-RS resources index {0,1,...,7} and resource set index {0,1, ..., 13}

FIG. 26

CSI-RS resources index {0,1,2,3} and resource set index {0,1, ..., 13} with L = 2

FIG. 27

| (0,0) | (0,2) | (0,4) | (0,6) | (0,8) | (0,10) | (0,12) | (0,14) | (0,16) | (0,18) | (0,20) | (0,22) | (0,24) | (0,26) |
|---|---|---|---|---|---|---|---|---|---|---|---|---|---|
| (0,1) | (0,3) | (0,5) | (0,7) | (0,9) | (0,11) | (0,13) | (0,15) | (0,17) | (0,19) | (0,21) | (0,23) | (0,25) | (0,27) |
| (1,0) | (1,2) | (1,4) | (1,6) | (1,8) | (1,10) | (1,12) | (1,14) | (1,16) | (1,18) | (1,20) | (1,22) | (1,24) | (1,26) |
| (1,1) | (1,3) | (1,5) | (1,7) | (1,9) | (1,11) | (1,13) | (1,15) | (1,17) | (1,19) | (1,21) | (1,23) | (1,25) | (1,27) |
| (2,0) | (2,2) | (2,4) | (2,6) | (2,8) | (2,10) | (2,12) | (2,14) | (2,16) | (2,18) | (2,20) | (2,22) | (2,24) | (2,26) |
| (2,1) | (2,3) | (2,5) | (2,7) | (2,9) | (2,11) | (2,13) | (2,15) | (2,17) | (2,19) | (2,21) | (2,23) | (2,25) | (2,27) |
| (3,0) | (3,2) | (3,4) | (3,6) | (3,8) | (3,10) | (3,12) | (3,14) | (3,16) | (3,18) | (3,20) | (3,22) | (3,24) | (3,26) |
| (3,1) | (3,3) | (3,5) | (3,7) | (3,9) | (3,11) | (3,13) | (3,15) | (3,17) | (3,19) | (3,21) | (3,23) | (3,25) | (3,27) |
| (0,0) | (0,2) | (0,4) | (0,6) | (0,8) | (0,10) | (0,12) | (0,14) | (0,16) | (0,18) | (0,20) | (0,22) | (0,24) | (0,26) |
| (0,1) | (0,3) | (0,5) | (0,7) | (0,9) | (0,11) | (0,13) | (0,15) | (0,17) | (0,19) | (0,21) | (0,23) | (0,25) | (0,27) |
| (1,0) | (1,2) | (1,4) | (1,6) | (1,8) | (1,10) | (1,12) | (1,14) | (1,16) | (1,18) | (1,20) | (1,22) | (1,24) | (1,26) |
| (1,1) | (1,3) | (1,5) | (1,7) | (1,9) | (1,11) | (1,13) | (1,15) | (1,17) | (1,19) | (1,21) | (1,23) | (1,25) | (1,27) |
| (2,0) | (2,2) | (2,4) | (2,6) | (2,8) | (2,10) | (2,12) | (2,14) | (2,16) | (2,18) | (2,20) | (2,22) | (2,24) | (2,26) |
| (2,1) | (2,3) | (2,5) | (2,7) | (2,9) | (2,11) | (2,13) | (2,15) | (2,17) | (2,19) | (2,21) | (2,23) | (2,25) | (2,27) |
| (3,0) | (3,2) | (3,4) | (3,6) | (3,8) | (3,10) | (3,12) | (3,14) | (3,16) | (3,18) | (3,20) | (3,22) | (3,24) | (3,26) |
| (3,1) | (3,3) | (3,5) | (3,7) | (3,9) | (3,11) | (3,13) | (3,15) | (3,17) | (3,19) | (3,21) | (3,23) | (3,25) | (3,27) |

1 RB (=12 REs)

⋮

(CSI-RS resources index k, resource set index s) with $S_{FDM} = 2$, where k = {0,1,2,3} and s = {0,1,...,27}

FIG. 28

CSI-RS resources index {0,1,...,7} and resource set index {0,1, ..., 6} with L = 2, N = 2

FIG. 29

CSI-RS resources index {0,1,2,3} and resource set index {0,1, ..., 6} with L = 2, N = 2

METHOD OF ALLOCATING CSI-RS FOR BEAM MANAGEMENT

CROSS-REFERENCE TO RELATED APPLICATION(S)

This application is a continuation application of prior application Ser. No. 15/934,490, filed on Mar. 23, 2018, which will be issued as U.S. Pat. No. 10,701,580 on Jun. 30, 2020, which is based on and claimed priority under 35 U.S.C. § 119(a) of a Korean patent application number 10-2017-0037155, filed on Mar. 23, 2017, in the Korean Intellectual Property Office, and of a Korean patent application number 10-2017-0057055, filed on May 4, 2017, in the Korean Intellectual Property Office, and of a Korean patent application number 10-2017-0101585, filed on Aug. 10, 2017, in the Korean Intellectual Property Office, the disclosure of each of which is incorporated by reference herein in its entirety.

TECHNICAL FIELD

The disclosure relates to a method and an apparatus for searching for or determining information on a beam that a user equipment (UE) or a base station can use for signal transmission and reception in a mobile communication system.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive multiple input and multiple output (MIMO), full dimensional MIMO (FD-MIMO), array antenna, analog beam-forming, and large-scale antenna technologies have been discussed. Further, to improve a network of the system, in the 5G communication system, technologies, such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid frequency shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to the internet of things (IoT) network that transmits/receives information between distributed components, such as things and processes the information. The internet of everything (IoE) technology in which the big data processing technology, and the like, is combined with the IoT technology by connection with a cloud server, and the like, has also emerged. To implement the IoT, technology elements, such as a sensing technology, wired and wireless communication and network infrastructure, a service interface technology, and a security technology, have been required. Recently, technologies, such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the M2M, and the MTC, have been implemented by techniques, such as the beamforming, the MIMO, and the array antenna. The application of the cloud RAN as the big data processing technology described above may also be considered as an example of the fusing of the 5G communication technology with the IoT technology.

In accordance with the recent development of LTE and LTE-advanced, a method of acquiring information on a beam that a user equipment (UE) or a base station may be used for signal transmission and reception in a mobile communication system may be required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a search procedure for searching for and determining information on a beam that a user equipment (UE) or a base station can use for signal transmission and reception. The disclosure provides a process of exchanging the searched beam information between the base station and the UE and sharing information on a beam to be used for subsequent transmission and reception.

Aspects of the disclosure are not limited to the above-mentioned aspects. For example, other aspects that are not mentioned may be obviously understood by those skilled in the art to which the disclosure pertains from the following description.

In accordance with an aspect of the disclosure, a method for beam management by a UE is provided. The method includes receiving, from a base station, channel state information reference signal (CSI-RS) resource information for beam management, the CSI-RS resource information including a repetition indicator indicating whether a CSI-RS resource set is repeated in a time domain and transmitting, to the base station, a beam report for the CSI-RS resource set based on the CSI-RS resource information.

According to the embodiment of the disclosure, the CSI-RS resource information includes at least one of a synchronization sequence (SS) block index having quasi-co-location (QCL) relationship with the CSI-RS resource set, resource allocation information for the CSI-RS resource set, and a transmission period for the CSI-RS resource set.

According to the embodiment of the disclosure, the CSI-RS resource set in a symbol is repeated across N symbols when the repetition indicator is set to a first value, and the CSI-RS resource set is located in a designated symbol when the repetition indicator is set to a second value.

According to the embodiment of the disclosure, the method further comprises selecting a beam to receive the CSI-RS resource set when the repetition indicator is set to the first value.

According to the embodiment of the disclosure, the CSI-RS resource information is received via one of master information block (MIB), system information block (SIB), and radio resource control (RRC) message.

In accordance with another aspect of the disclosure, a method for beam management by a base station is provided. The method includes transmitting, to a UE, CSI-RS resource information for beam management, the CSI-RS resource information including a repetition indicator indicating whether a CSI-RS resource set is repeated in a time domain and receiving, from the UE, a beam report for the CSI-RS resource set based on the CSI-RS resource information.

According to the embodiment of the disclosure, the CSI-RS resource information includes at least one of a SS block index having QCL relationship with the CSI-RS resource set, resource allocation information for the CSI-RS resource set, and a transmission period for the CSI-RS resource set.

According to the embodiment of the disclosure, the CSI-RS resource set in a symbol is repeated across N symbols when the repetition indicator is set to a first value, and the CSI-RS resource set is located in a designated symbol when the repetition indicator is set to a second value.

According to the embodiment of the disclosure, a beam to receive the CSI-RS resource set is selected when the repetition indicator is set to the first value.

According to the embodiment of the disclosure, the CSI-RS resource information is transmitted via one of MIB, SIB, and RRC message.

In accordance with another aspect of the disclosure, a UE for performing beam management is provided. The UE includes a transceiver and at least one processor coupled with the transceiver and configured to control to receive, from a base station, CSI-RS resource information for beam management, the CSI-RS resource information including a repetition indicator indicating whether a CSI-RS resource set is repeated in a time domain and transmit, to the base station, a beam report for the CSI-RS resource set based on the CSI-RS resource information.

In accordance with another aspect of the disclosure, a base station for performing beam management is provided. The base station includes a transceiver and at least one processor coupled with the transceiver and configured to control to transmit, to a UE, CSI-RS resource information for beam management, the CSI-RS resource information including a repetition indicator indicating whether a CSI-RS resource set is repeated in a time domain and receive, from the UE, a beam report for the CSI-RS resource set based on the CSI-RS resource information.

According to an embodiment of the disclosure, it is assumed that the disclosure is based on a two-layer beam configuration. The first layer beam referred in the disclosure refers to the base station beam used to transmit the SS blocks. The first layer beam may be used for control and data transmission until the search for the second layer beam is completed. Hereinafter, the beam searching and setting procedure for the first layer will be referred to as the P1 beam management (P1 BM) operation. The second layer beam referred in the disclosure refers to the base station beam used for control and data transmission. Hereinafter, the beam searching and setting procedure for the second layer will be referred to as the P2 beam management (P2 BM) operation. The disclosure proposes the method of operating a base station/UE for supporting P1 and P2 procedures and the method of allocating CSI-RS for beam search.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating an embodiment of a method of configuring a first CSI-RS (=Cell-specific RS) according to an embodiment of the disclosure;

FIGS. 7A and 7B are diagrams illustrating an embodiment (tracking RS support) of a method of configuring a first CSI-RS (support of two antenna ports) according to various embodiments of the disclosure;

FIGS. 11A, 11B, and 11C are diagrams illustrating a process of transmitting an SS-block and CSI-RS resource sets according to various embodiments of the disclosure;

FIG. 14 is a diagram illustrating an embodiment of an RE mapping pattern of a CSI-RS according to an embodiment of the disclosure;

FIG. 16 is a diagram illustrating an embodiment that may be used only for P1 beam management (P1 BM) without tracking RS support according to an embodiment of the disclosure;

FIG. 17 is a diagram illustrating an embodiment that may be used only for P1 BM without a tracking RS support according to an embodiment of the disclosure;

FIG. 18 is a diagram illustrating an embodiment that supports time-domain repetition according to an embodiment of the disclosure;

FIG. 19 is a diagram illustrating an RE mapping pattern of a CSI-RS, in which a case in which code division multiplexing (CDM) is not applied between resources is illustrated according to an embodiment of the disclosure;

FIG. 20 is a diagram illustrating an RE mapping pattern of a CSI-RS, in which a case in which a CDM is applied between resources is illustrated according to an embodiment of the disclosure;

FIG. 21 is a diagram illustrating an RE mapping pattern of a CSI-RS, and illustrates a case in which CDM is not applied between resources according to an embodiment of the disclosure;

FIG. 22 is a diagram illustrating an embodiment defining several resource sets in one orthogonal frequency division multiplexing (OFDM) symbol according to an embodiment of the disclosure;

FIG. 23 is a diagram illustrating an embodiment defining several resource sets in one OFDM symbol according to an embodiment of the disclosure;

FIGS. 24, 25, 26, 27, 28, and 29 are diagrams illustrating a resource index and a resource set index of a CSI-RS transmitted in one slot according to various embodiments of the disclosure;

Throughout the drawings, it should be noted that like reference numbers are used to depict the same or similar elements, features, and structures.

DETAILED DESCRIPTION

Figure 1:
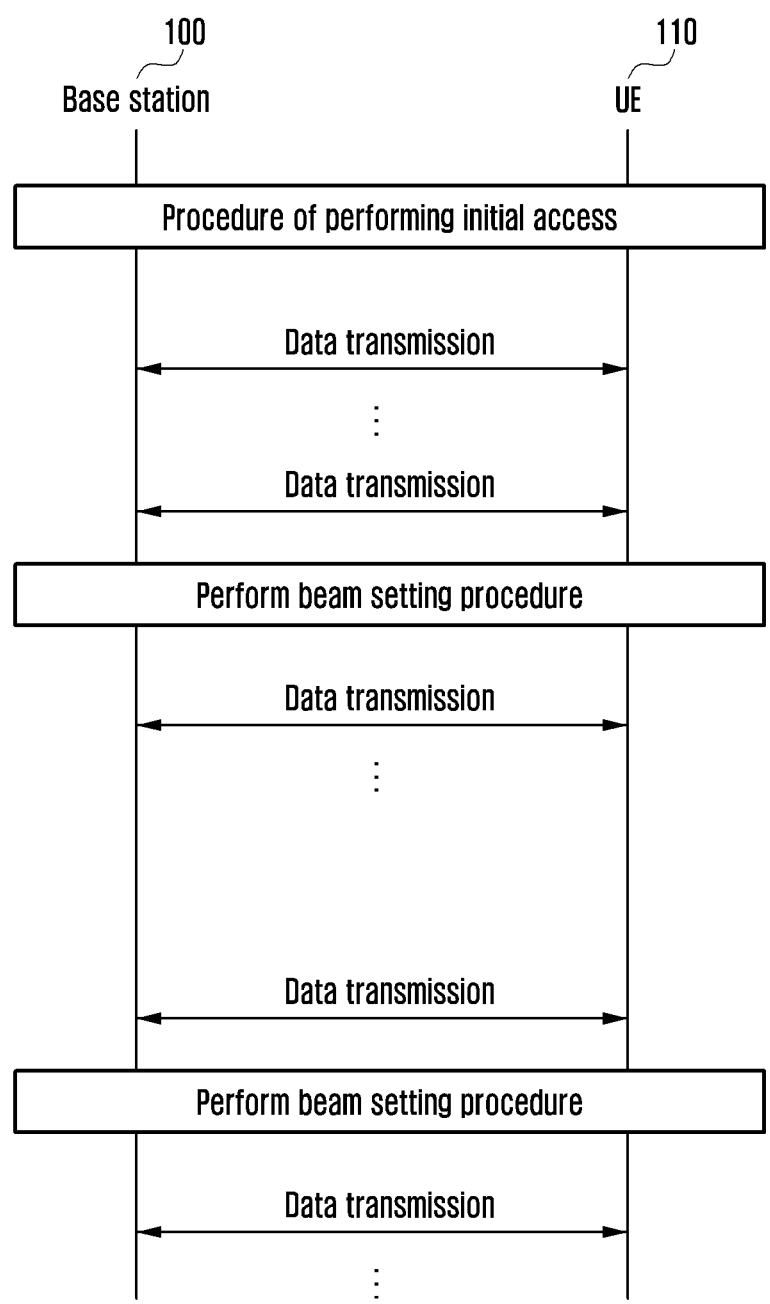
FIG. 1 is a diagram illustrating an overall operation according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various advantages and features of the disclosure and methods accomplishing the same will become apparent from the following detailed description of embodiments with reference to the accompanying drawings. However, the disclosure is not limited to the embodiments disclosed herein but will be implemented in various forms. The embodiments have made disclosure of the disclosure complete and are provided so that those skilled in the art can easily understand the scope of the disclosure. Therefore, the disclosure will be defined by the scope of the appended claims. Like reference numerals throughout the description denote like elements.

First Embodiment: Method of Operating P3 Procedure Based on Synchronization Sequence (SS) Block Index Reporting The disclosure assumes a two-layer beam configuration as a basis. The first layer beam referred in the disclosure refers to the base station beam used to transmit the SS blocks. The first layer beam may be used for control and data transmission until the search for the second layer beam is completed. Hereinafter, the procedure of searching for and setting the beam for the first layer will be referred to as the P1 beam management (P1 BM) operation. The second layer beam referred in the disclosure refers to the base station beam used for control and data transmission. Hereinafter, the beam searching and setting procedure for the second layer will be referred to as the P2 beam management (P2 BM) operation.

Meanwhile, a P3 beam management (P3 BM) operation referred to in the disclosure refers to a process of supporting a search for a terminal beam.

FIG. 1 is a diagram illustrating an overall operation according to an embodiment of the disclosure.

Referring to FIG. 1, upon an initial access, a base station 100 and a user equipment (UE) 110 complete the searching and setting of the beam that may be used for signal transmission and reception between the base station 100 and the UE 110. The beam corresponds to a beam belonging to the first layer. The configuration for the beam set upon the initial access may be updated to the setting of the beam belonging to the second layer while an additional beam setting procedure is performed during data transmission after the initial access.

In this case, the search for the beam means a process of searching for and determining information on beams that the UE 110 or the base station 100 can use for signal transmission and reception. Meanwhile, the setting of the beam refers to a process of exchanging the searched beam information between the base station 100 and the UE 110 and sharing information on a beam to be used for subsequent transmission and reception.

The disclosure provides two representative embodiments for performing the beam searching and setting procedure. On the other hand, it may be determined whether to operate according to the first embodiment or the second embodiment depending on according to whether the following cell-specific reference signal (RS) is allocated. For example, when the cell-specific RS is not allocated, the base station/terminal may be operated as in the first embodiment. Meanwhile, when the cell-specific RS is not allocated, the base station/terminal may be operated as in the second embodiment. Meanwhile, it may be determined whether to operate according to the first embodiment or to operate according to the second embodiment depending on the determined of the base station. For example, the base station may notify the terminal of the setting of whether to perform a BM operation based on any of the two embodiments.

Figure 2A:
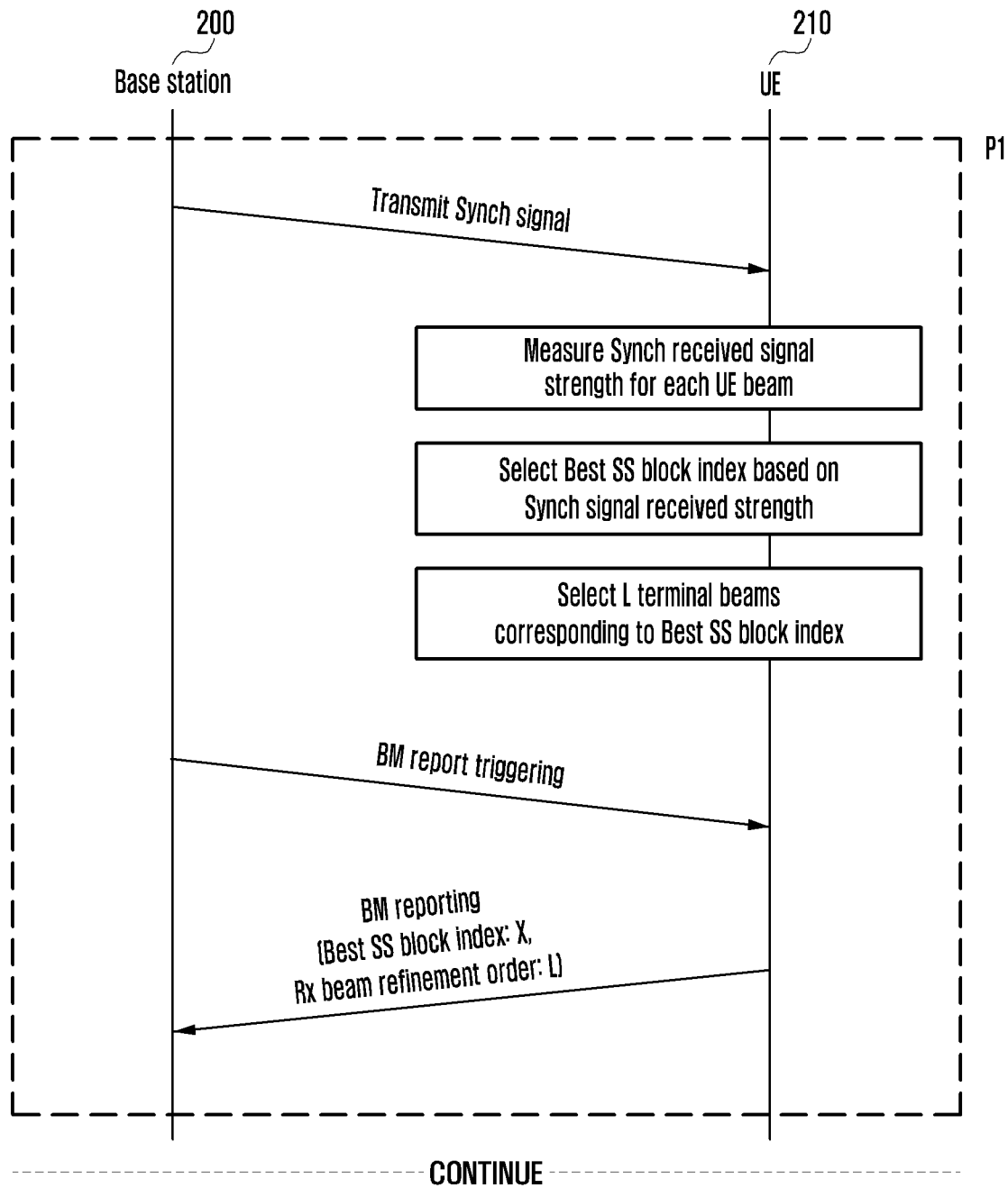
FIGS. 2A and 2B are diagrams illustrating a first embodiment (when a cell-specific reference signal (RS) is not allocated) for performing a beam searching and setting procedure according to various embodiments of the disclosure.
Figure 2B:
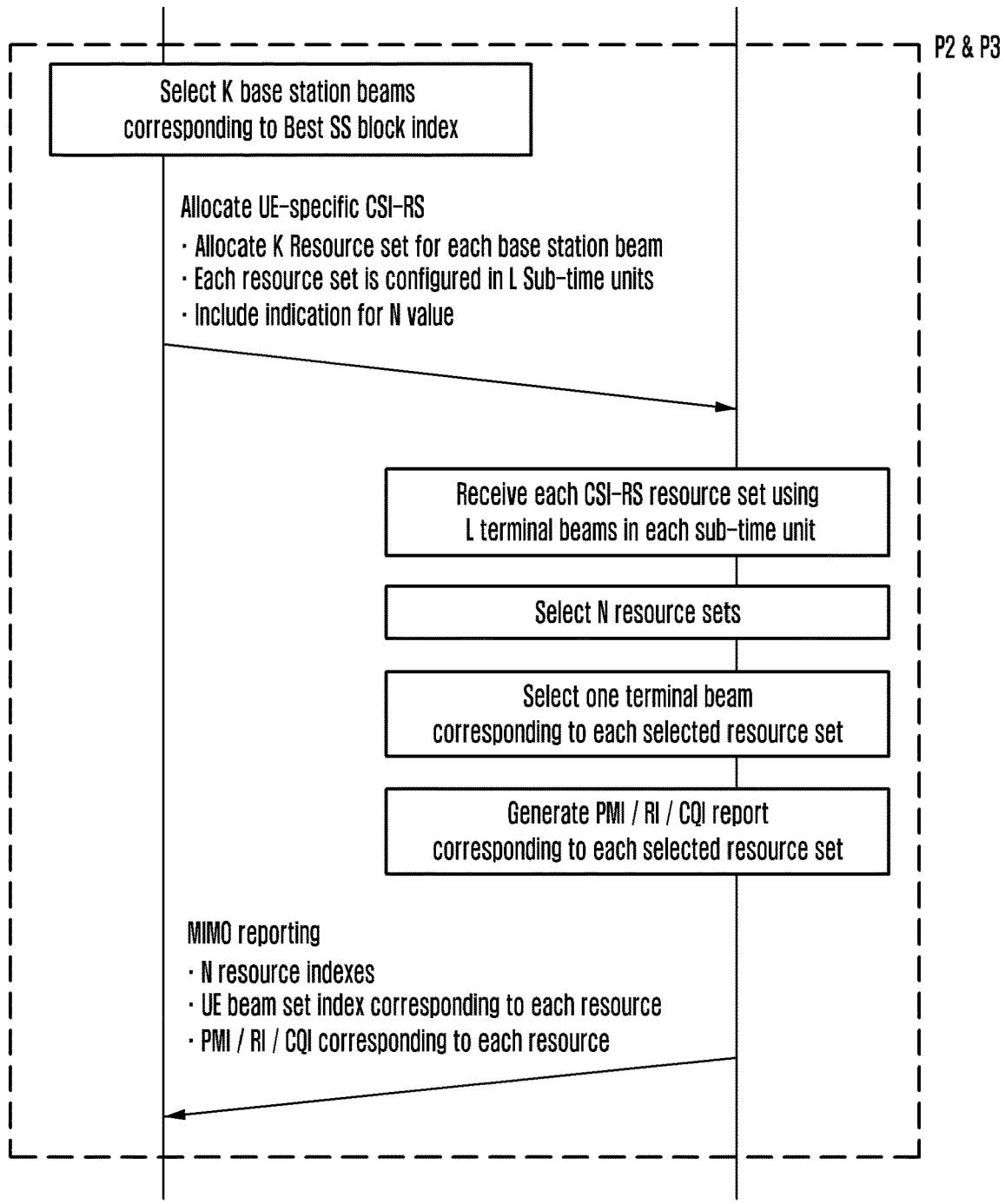

FIGS. 2A and 2B are diagrams illustrating a first embodiment (when a cell-specific RS is not allocated) for performing a beam searching and setting procedure according to various embodiments of the disclosure.

Referring to FIG. 2A, at this time, a UE 210 receives a Synch signal consisting of SS blocks for performing a P1 procedure from a base station 200. The UE 210 determines a preferred best SS block index based on the received Synch signal and feeds back the determined best SS block index to the base station 200. At this time, the UE 210 can select an L value which is a value corresponding to the number of terminal reception beams used to receive the best SS block index. The number of best SS block index to be fed back to the base station 200 may be one or more, and the base station may set the number of best indexes to be fed back in the terminal.

Referring to FIG. 2B, in the following P2 and P3 processes, the beam search is performed by allocating UE-specific RS. The base station 200 selects K base station beams to be used for the P2 and P3 procedures based on the best SS block index information that the UE 210 feed backs. Then, the UE-specific RS consisting of K base station beams is allocated, so that the UE 210 may select the best N base station beams. At this time, the UE-specific RS may be repeatedly transmitted L times on a time base based on the number of terminal beams L. In order to efficiently perform such repetitive transmission, the UE-specific RS may have an orthogonal frequency division multiplexing (OFDM) symbol length shorter than an OFDM symbol length used for general data transmission. The OFDM symbol length having the short length is named a sub-time unit in FIGS. 2A and 2B.

The UE 210 receives each channel state information RS (CSI-RS) resource set using L terminal beams in each sub-time unit. The UE 210 selects N resource sets, selects a corresponding UE beam for each selected resource set, and generates a corresponding precoding matrix indicator (PMI)/rank indicator (RI)/channel quality indicator (CQI) report for each selected resource set. Then, the UE 210 reports multiple input and multiple output (MIMO) reporting (N resource index, UE beam set index corresponding to each resource, PMI/RI/CQI corresponding to each resource) to the base station 200.

Second Embodiment: Method of Operating P3 Procedure Based on P-CSI-RS Having a Quasi-Co-Location (QCL) Relationship with SS Block FIGS. 3A and 3B are diagrams illustrating a second embodiment (when a cell-specific RS is allocated) for performing a beam searching and setting procedure according to various embodiments of the disclosure.

Figure 3A:
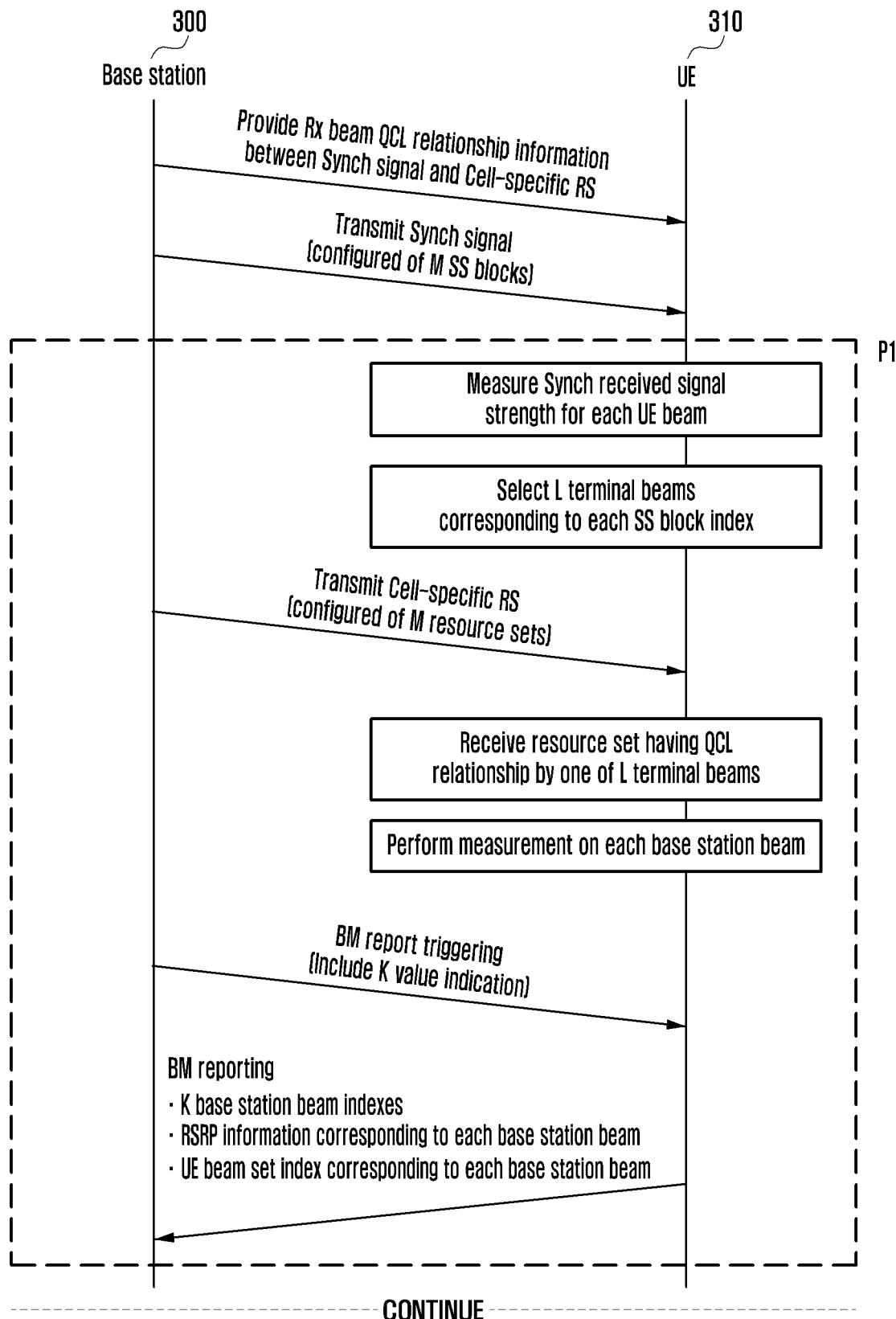
FIGS. 3A and 3B are diagrams illustrating a second embodiment (when a cell-specific RS is allocated) for performing a beam searching and setting procedure according to various embodiments of the disclosure.
Figure 3B:
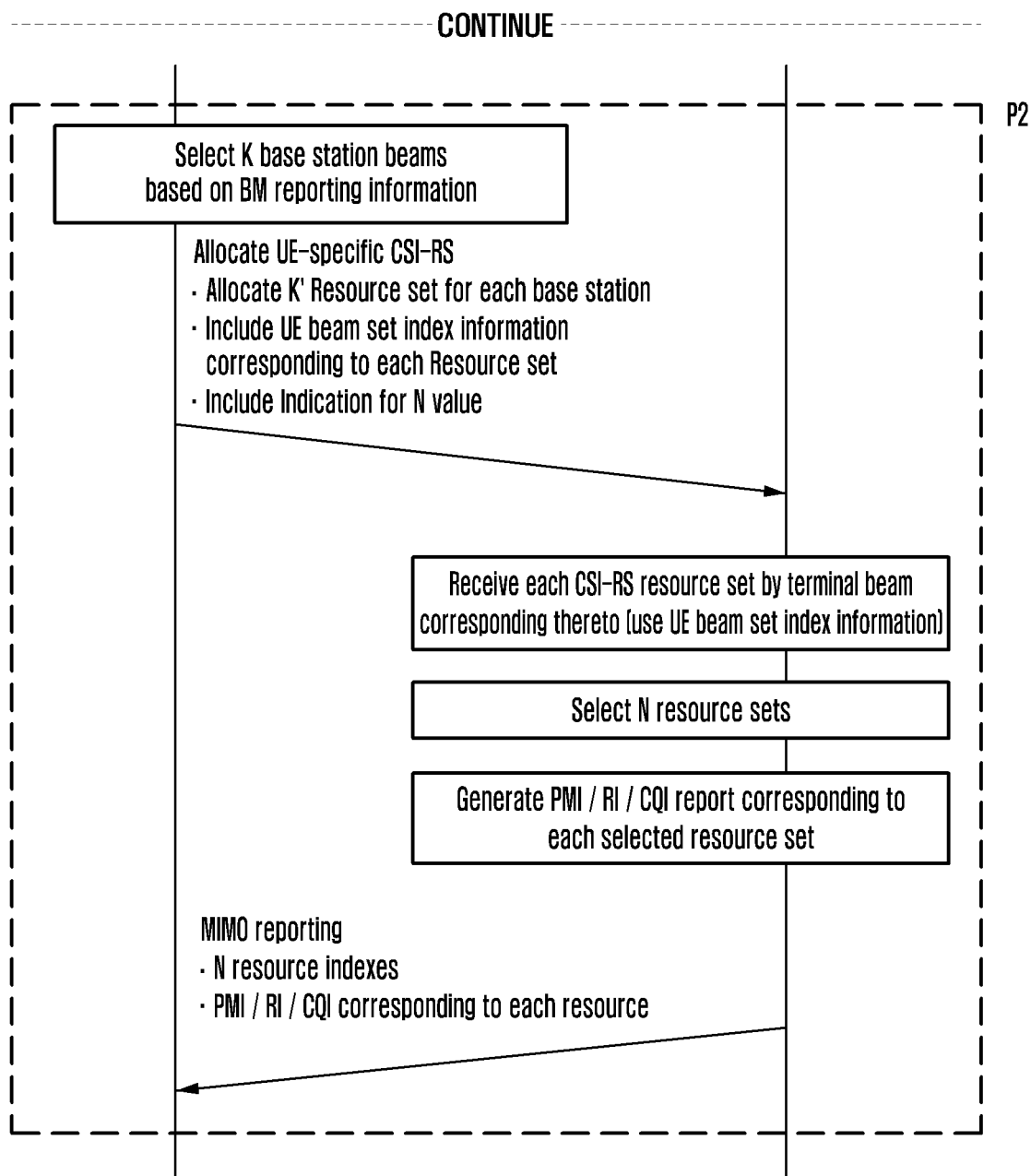

Referring to FIGS. 3A and 3B, a base station 300 provides Rx beam QCL relationship information between the Synch signal and the cell-specific RS to the UE 310 and transmits a Synch signal (composed of M SS blocks) to the UE 310. The UE 310 measures the strength of the received signal strength of each UE and selects L corresponding terminal beams for each SS block index. The base station 300 transmits the cell-specific RS (Consisting of M resource sets) to perform the P1 procedure.

The UE 310 receives a resource set having a QCL relationship using the cell-specific RS with one terminal beam out of L, performs measurement on the base station beam through the reception of the cell-specific RS and performs a BM report upon the request of the base station 300. When the base station 300 requests the BM report to the UE 310, the base station 300 may indicate the following K value to the UE 310. At this time, the BM report may include information indicating K base station beam indexes and received signal strength information of the K beams. In addition, for the K base station beams, the terminal can also report UE beam set index information together.

For K' beams reported to the base station 300 having the same UE beam set index among the K base station beams, the base station 300 assumes that the UE 310 can receive a signal using the same terminal beam. The base station 300 receiving the BM report including the UE beam set index may simultaneously use beams corresponding to a base station beam IDs having the same set index to transmit and receive signals to and from the UE 310. Alternatively, to transmit and receive a signal to and from the terminal, the base station may alternately use the base station beams corresponding to the base station beam IDs having the same set index without notifying the terminal in advance. The cell-specific RS for the P1 BM operation may be replaced with the UE-specific RS for the P1 BM according to the determination of the base station and set.

Third Embodiment: CSI-RS Resource Setting Method for Beam Management

Hereinafter, a CSI-RS resource setting method according to the disclosure will be described. The disclosure includes three types of CSI-RS resource setting methods each of which is referred to as "P1 BM and tracking RS," "P2 and P3 BM," and "P2 BM and MIMO CSI".

The first type of CSI-RS means the cell-specific RS referred to in the beam searching and setting method. The first type of CSI-RS may be used for the P1 BM and the Tracking RS. This means that the CSI-RS allocation of the first method may be established based on system information block (SIB) or radio resource control (RRC). On the other hand, the first type of CSI-RS used for the P1 BM and the Tracking RS may not be allocated according to the selection of the base station. The base station may indicate to the terminal whether the first type of CSI-RS is allocated in master information block (MIB).

The following Table 1 shows specific parameters for setting the first type of CSI-RS. The CSI-RS is always set as periodic transmission.

TABLE 1

CSI-RS resource setting

Type: BM P1
Set index: m'
QCL info: SS block index m
Resource setting: Slot & Symbol-level
Number of resources per symbol: {2, 4, 8, 16, 32, 64}
Number of antenna ports per resource: {1, 2}
Sub-time unit order (L): {1, 2, 4}
if L > 1,
    Time-domain repetition distance (D): D = {0, 4}
        If D = 0, no repetition is applied
        If D = 4, time-domain repetition is applied
Tx period: {5 ms, 10 ms, 15 ms, 20 ms} periodic
Subcarrier spacing: {60 KHz, 120 KHz, 240 KHz}

The following various embodiments are possible depending on the specific parameter values used for the first type of CSI-RS setting.

The following Table 2 is an embodiment that may be used only for the P1 BM without Tracking RS support. The specific CSI-RS allocation results according to the following embodiment are illustrated in FIGS. 4 and 5.

Figure 4:
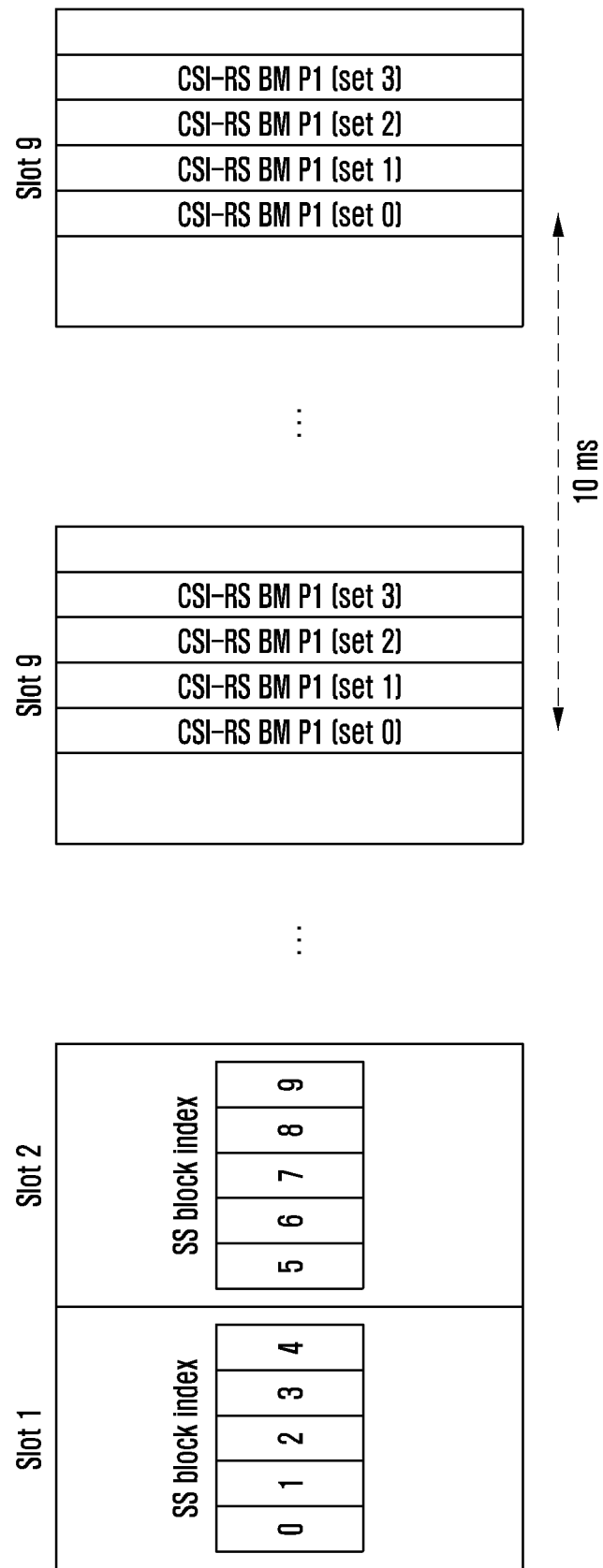
FIG. 4 is a diagram illustrating a quasi-co-location (QCL) relationship between a synchronization sequence (SS) block and a first channel state information RS (CSI-RS) (=Cell-specific RS) according to an embodiment of the disclosure.

FIG. 4 is a diagram illustrating a QCL relationship between an SS block and a first CSI-RS (=Cell-specific RS) according to an embodiment of the disclosure.

FIG. 5 is a diagram illustrating an embodiment of a method of configuring a first CSI-RS (=Cell-specific RS) according to an embodiment of the disclosure.

Referring to FIG. 4, CSI-RS resource sets 0, 1, 2, and 3 each have a QCL relationship with SS block indexes 0, 1, 2, and 3. At this time, it means that at least one terminal beam of the L terminal beams searched in the SS block having the QCL relationship may be used in the CSI-RS having the QCL relationship.

Referring to FIG. 5, since two OFDM symbols are used in each resource set and 8 resources are set per symbol, a total of 16 CSI-RS resources are repeatedly allocated on a frequency base in one resource as illustrated in FIG. 5. Since a total of 4 resource sets are set, so that a total of 64 CSI-RS resources may be set in the terminal through the setting as illustrated in the following Table 2.

TABLE 2

Common parameters

Number of symbols per resource set: 2
Number of resources per symbol: 8
Number of antenna ports per resource:1
Sub-time unit order (L): 1
Tx period: 10 ms
Subcarrier spacing: 60 KHz
Set specific parameters

| | |
|---|---|
| Set index: 0 | Set index: 2 |
| Qainfo: SS block index 0 | QCL info: SS block index 2 |
| Resource setting: $10^{th}$ slot and $5^{th}$-$6^{th}$ | Resource setting: $10^{th}$ slot and |
| symbol | $9^{th}$-$10^{th}$ symbol |
| Set index: 1 | Set index: 3 |
| QCL info: SS block index 1 | QCL info: SS block index 3 |
| Resource setting: $10^{th}$ slot and $7^{th}$-$8^{th}$ | Resource setting: $10^{th}$ slot and |
| symbol | $11^{th}$-$12^{th}$ symbol |

The following Table 3 shows an embodiment supporting the Tracking RS. The specific CSI-RS allocation results according to the following embodiment are illustrated in FIG. 6.

Figure 6:
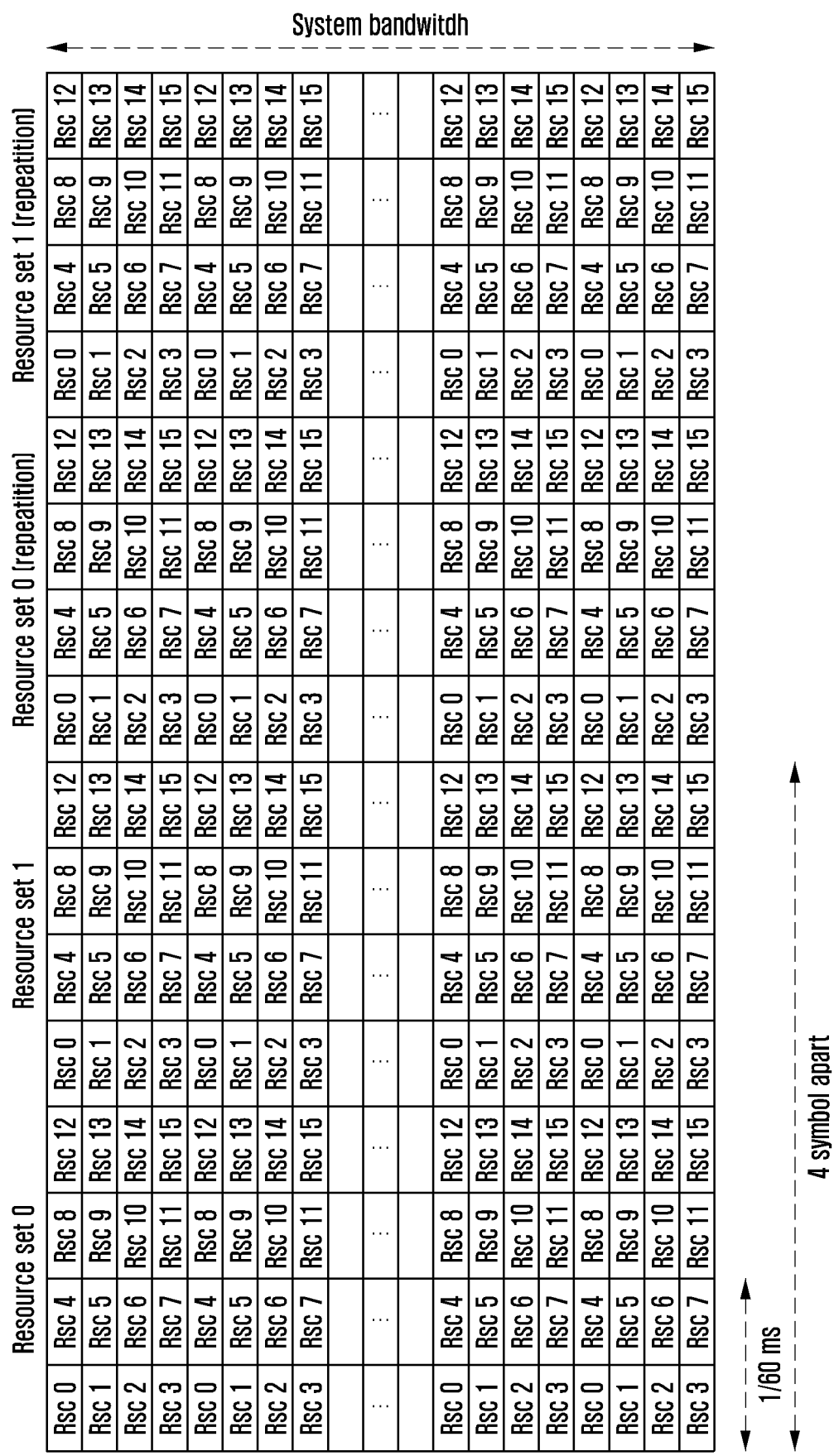
FIG. 6 is a diagram illustrating an embodiment (tracking RS support) of the method of configuring a first CSI-RS (=Cell-specific RS) according to an embodiment of the disclosure.

FIG. 6 is a diagram illustrating an embodiment (tracking RS support) of the method of configuring a first CSI-RS (=Cell-specific RS) according to an embodiment of the disclosure.

Referring to FIG. 6, since the number of resources per symbol is 4 and a total of 4 symbols are allocated in one resource set (number of symbols per resource set 2×sub-time unit order 2=4), a total of 16 CSI-RS resources are allocated in one resource set. Meanwhile, since a time-domain repetition distance is allocated as D=4, as illustrated in FIG. 6, the CSI-RS resources corresponding to the corresponding resource set are repeatedly allocated to a location separated by 4 symbols based on sub-carrier spacing 60 KHz.

TABLE 3

Common parameters
    Number of symbols per resource set: 2
    Number of resources per symbol: 4
    Number of antenna ports per resource: 1
    Sub-time unit order (L): 2
    Time-domain repetition distance (D symbols apart): D = 4
    Tx period: 10 ms
    Subcarrier spacing: 60 KHz
Set specific parameters
    Set index: 0
        QCL info: SS block index 0
        Resource setting: $10^{th}$ slot and $5^{th}$-$6^{th}$ symbol
    Set index: 1
        QCL info: SS block index 1
        Resource setting: $10^{th}$ slot and $7^{th}$-$8^{th}$ symbol The following Table 4 illustrates an embodiment supporting two antenna ports. The specific CSI-RS allocation results according to the present embodiment are illustrated in FIGS. 7A and 7B.

Figure 7A:
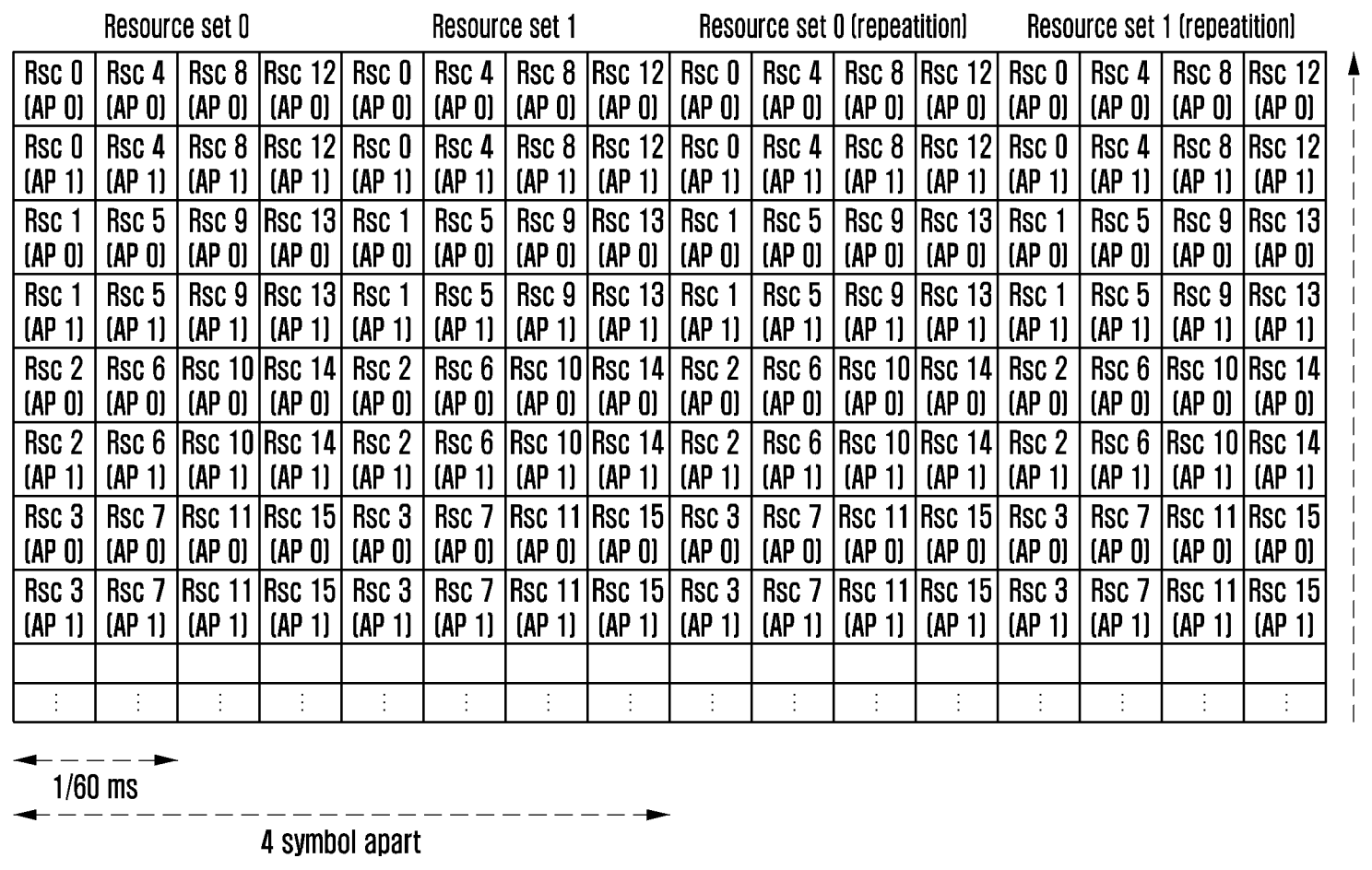

FIGS. 7A and 7B are diagrams illustrating an embodiment (tracking RS support) of the method of configuring a first CSI-RS (support of two antenna ports) according to various embodiments of the disclosure.

Referring to FIGS. 7A and 7B, unlike the previous embodiment of the disclosure, one CSI-RS resource having two antenna ports is allocated to two neighboring REs on a frequency axis.

TABLE 4

Common parameters
    Number of symbols per resource set: 2
    Number of resources per symbol: 4
    Number of antenna ports per resource: 2
    Sub-time unit order (L): 2
    Time-domain repetition distance (D symbols apart): D = 0
    Tx period: 10 ms
    Subcarrier spacing: 60 KHz
Set specific parameters
    Set index: 0
        QCL info: SS block index 0
        Resource setting: $10^{th}$ slot and $5^{th}$-$6^{th}$ symbol TABLE 4-continued Set index: 1
  QCL info: SS block index 1
  Resource setting: $10^{th}$ slot and $7^{th}$-$8^{th}$ symbol The second type of CSI-RS may be used for P2 BM and P3 BM. This may be distinguished from the first type of CSI-RS allocation method in terms of the following aspects.
  Periodic or aperiodic
    Sub-time unit order (L) is dynamically indicated by DCI for aperiodic transmission
    Sub-time unit order (L) is configured by RRC or MAC CE for aperiodic transmission
  UE-specifically configured by RRC or MAC CE
  If sub-time unit is triggered, same resource ID between sub-time units on the same RE position. (for P3 support)
  Time-domain repetition with D symbols apart is not supported (i.e., no CFO tracking support)
  QCL association with CSI-RS for P1 BM
    If CSI-RS for P1 BM is not configured, then this association is applied to SS blocks.

The third type of CSI-RS may be used for the P2 BM and the MIMO CSI. This may use the same method as the method of allocating CSI-RS used in full dimensional MIMO (FD-MIMO) of the existing long-term evolution (LTE).

Figure 8:
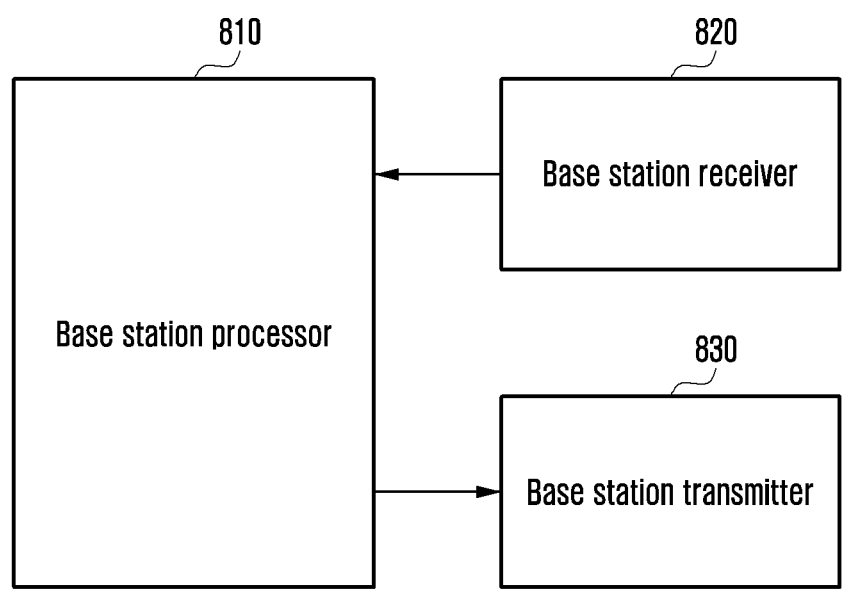
FIG. 8 is a diagram illustrating a configuration of a base station according to an embodiment of the disclosure.

FIG. 8 is a diagram illustrating a configuration of a base station according to an embodiment of the disclosure.

Referring to FIG. 8, a base station processor 810 according to an embodiment of the disclosure may perform the beam searching and setting procedure using information transmitted and received through a base station receiver 820 and a base station transmitter 830. The base station processor 810 may control the base station receiver 820 and the base station transmitter 830 and may perform the base station operation according to the embodiments of the disclosure.

Figure 9:
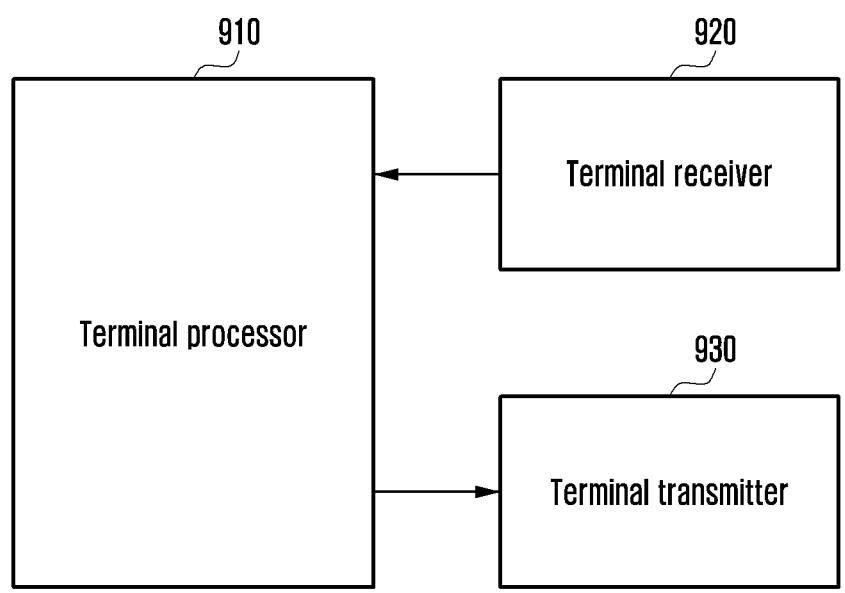
FIG. 9 is a diagram illustrating a configuration of a terminal according to an embodiment of the disclosure.

FIG. 9 is a diagram illustrating a configuration of a terminal according to an embodiment of the disclosure.

Referring to FIG. 9, a terminal processor 910 according to an embodiment of the disclosure may perform the beam searching and setting procedure using information transmitted and received through a terminal receiver 920 and a terminal transmitter 930. The terminal processor 910 may control the terminal receiver 920 and the terminal transmitter 930 and may perform the terminal operation according to the embodiments of the disclosure.

Hereinafter, another CSI-RS resource setting method according to the disclosure will be described, and this CSI-RS may be used for P1, P2, and P3 BM referred to in the beam searching and setting method. The base station may transmit the setting of the CSI-RS to the terminal through the MIB, the SIB, or the RRC. Meanwhile, the CSI-RS may not be allocated according to the selection of the base station, and the base station may indicate to the terminal whether the CSI-RS is allocated in the MIB or the SIB.

The following Table 5 shows specific parameters for setting the CSI-RS. The CSI-RS may be set as the periodic transmission or non-periodic transmission. Meanwhile, activation/deactivation of the CSI-RS may be set for each resource set. For example, the CSI-RS resource set as the activation is periodically transmitted, and the transmission of the CSI-RS resource set as the deactivation is periodically stopped. If the terminal receives PDSCH scheduling in a slot including the CSI-RS resource set as the periodic transmission, the terminal may perform decoding under the assumption that the PDSCH is not allocated in the OFDM symbol including the CSI-RS resource.

TABLE 5

CSI-RS resource setting

Type: Beam management
Set index: m'
QCL info: SS block index m (or CSI-RS resource set index m)
Resource allocation: Slot index & Symbol index & Number of symbols (N)
Time-domain repetition indicator: {1, 0}
If repetition is activated, a resource set in one OFDM symbol is repeated across N symbols
If repetition is not activated, N × K resources are defined in a resource set within N symbols
Number of resources per symbol (K): {2, 4, 8}
Alt 1) CDM-K among resources
Alt 2) no CDM between resources
Number of antenna ports per resource: {1, 2}
Alt 1) CDM-2 between antenna ports (if P = 2)
Alt 2) no CDM between antenna ports
Sub-carrier spacing (f_s): {60, 120, 240 KHz}
Sub-time unit order (L): {1, 2, 4}
Tx period: {5, 10, 15, 20 ms} periodic
Density reduction parameter: Gap = { }, Shift value = { }
Alt 1) Gap between ports
Alt 2) Gap between resources
Alt 3) Gap between resource groups The following Table 6 shows a configuration example for CSI-RS resource set No. 0 having the QCL relationship with SS block index No. 0. The resource set is located in a 5-th symbol in a 10-th slot. At this time, the slot index follows criteria defined in reference numerology signaled in the MIB. For example, assuming that the reference numerology is 60 KHz, a total of 40 slots may be defined within a 10 ms radio frame (assuming a length of 0.25 ms per slot). Meanwhile, assuming that the reference numerology is 120 KHz, a total of 80 slots may be defined within the 10 ms radio frame (assuming a length of 0.125 ms per slot). The resource set is transmitted in the 5-th symbol based on the symbol index reference defined by f_s KHz in the slot. For example, if the reference numerology is 60 KHz or 120 KHz, a total of 56 or 28 defined by f_s=240 KHz symbols are included in one slot.

The sub-time unit order (L) is a parameter indicating how many sub-symbols the one symbol consists of. In the case of L=1, one symbol may not consist of sub-symbols. In the case of L>1, one symbol may consist of L sub-symbols using an interleaved frequency division multiple access (IFDMA) scheme. At this time, the same transmission signal is repeatedly transmitted between the sub-symbols, and the base station beam is kept unchanged among the sub-symbols.

The time-domain repetition indicator is a parameter indicating whether the symbol is repeated at the symbol level in the time domain. For example, when this value is set to be 0, the resource set is located only in the 5-th symbol in the 10-th slot. The indicator value may be set to be 1 only if an N value is greater than 1, and if the N value is set to be 1, the resource set defined in one OFDM symbol is repeatedly transmitted over N symbols.

The resource set is repeatedly transmitted with a transmission period of "10 ms".

The density reduction parameter is a value set so that the resource set can use only a part of resources in the symbol defined by the f_s KHz. Since gap=0 RE, the present example is an example in which the density reduction function is not supported.

TABLE 6

CSI-RS resource setting

Type: Beam management
Set index: 0
QCL info: SS block index 0
Resource allocation: 10-th Slot, 5-th Symbol, N = 1
Time-domain repetition indicator: 0
Number of resources per symbol (K): 4
Number of antenna ports per resource: 2
Sub-carrier spacing (f_s): 240 KHz
Sub-time unit order (L): 1
Tx period: 10 ms periodic
Density reduction parameter: Gap = 0 REs, Shift value = 0-th RE The resource element (RE) mapping pattern of the specific CSI-RS resources shown in the above Table 6 is illustrated in FIG. 10.

Figure 10:
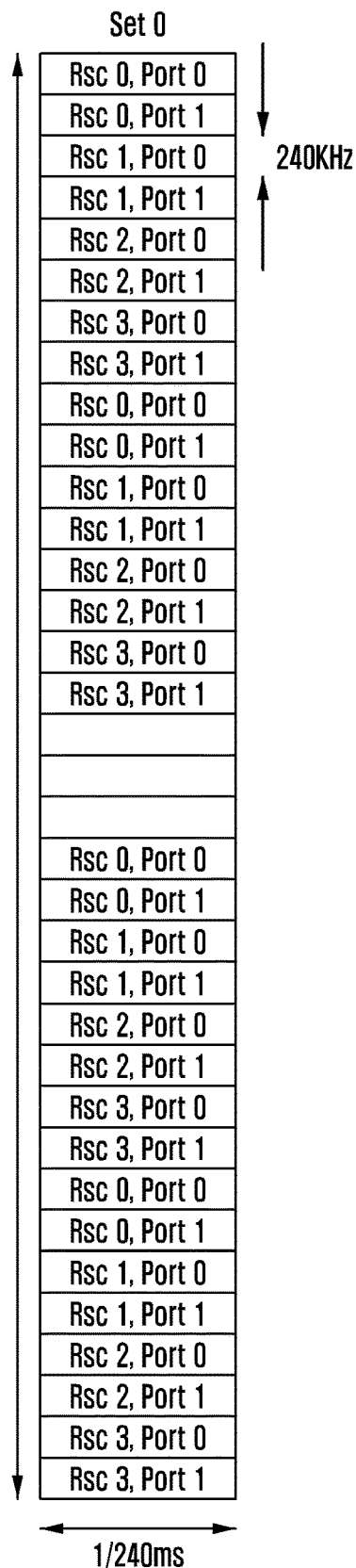
FIG. 10 is a diagram illustrating a resource element (RE) mapping pattern of CSI-RS resources according to an embodiment of the disclosure.

FIG. 10 is a diagram illustrating an RE mapping pattern of CSI-RS resources according to an embodiment of the disclosure.

Referring to FIG. 10, the code division multiplexing (CDM) is not applied. As illustrated in FIG. 10, the RE mapping pattern of the K CSI-RS resources is repeatedly shown while being FDMed within the configured CSI-RS BW.

Figure 11A:
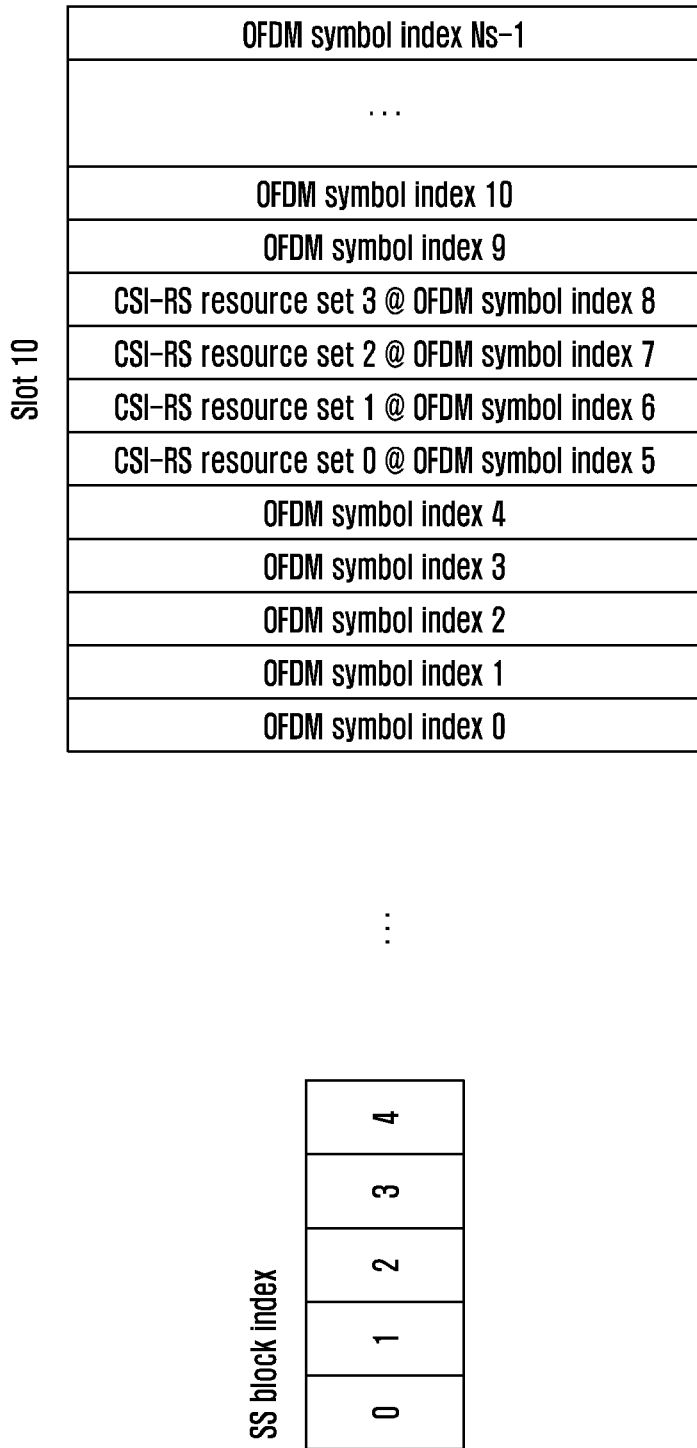
Figure 11C:
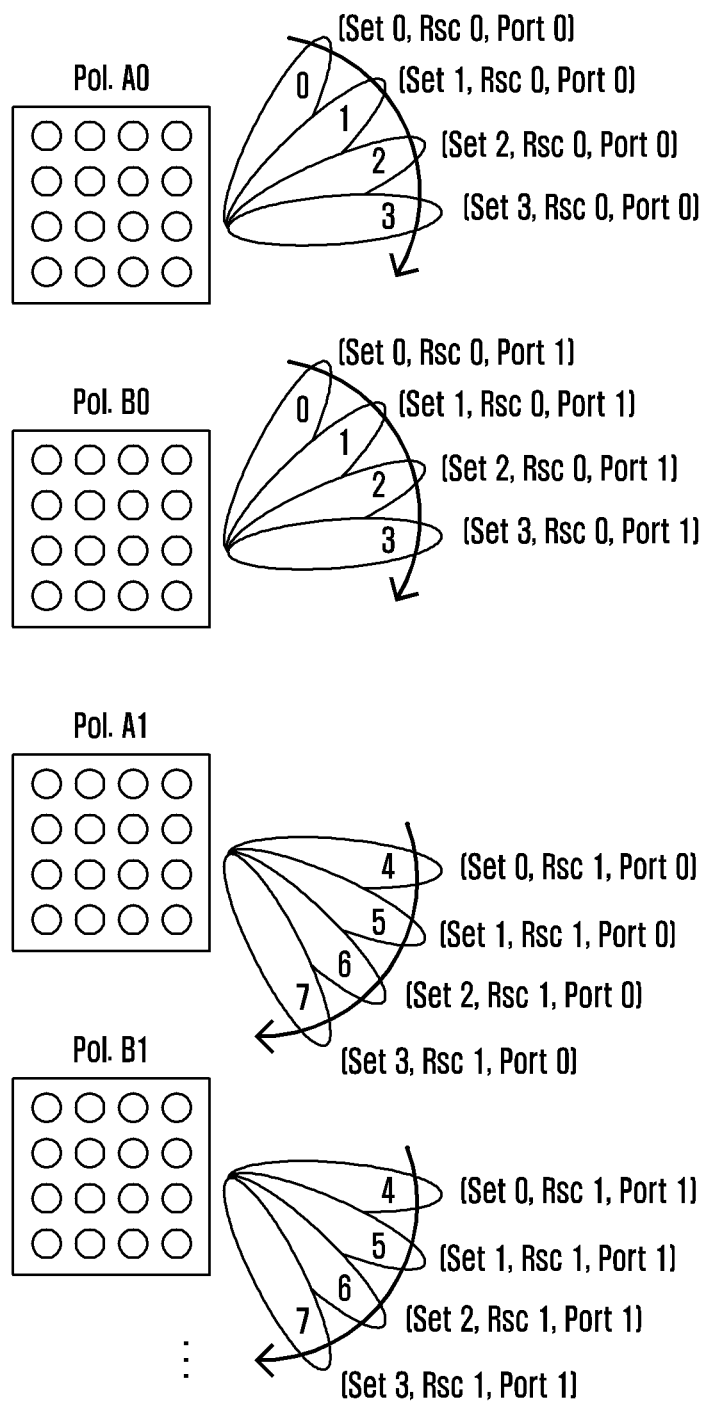

FIGS. 11A, 11B, and 11C are diagrams illustrating a process of transmitting an SS-block and CSI-RS resource sets according to various embodiments of the disclosure.

Referring to FIGS. 11A, 11B, and IC, in addition to CSI-RS resource set 0 having the QCL relationship with SS block index 0, if the CSI-RS resource sets 1, 2, and 3 having the QCL relationship with the SS block indexes 1, 2, and 3 are configured in symbol indexes 6, 7, and 8 in the same 10-th slot, SS-block and CSI-RS resource sets may be transmitted as illustrated in FIG. 11A. Here, the SS-block and the CSI-RS resource set indicated by the same color have the same QCL relationship. It is assumed that the same base station beam is used for transmission in the SS-block and the CSI-RS resource set having the QCL relationship associated with each other.

Referring to FIG. 11B, CSI-RS resource sets 0, 1, 2 and 3 having a QCL relationship with the SS block index 0, 1, 2 and 3 are transmitted based on the configured CSI-RS BW and a predetermined symbol position (based on the time-unit length set based on the f_s value). Referring to FIG. 11C, CSI-RS resource sets may be transmitted through predetermined base station beams determined based on a CSI-RS resource set, a resource index (CSI-RS), and a port index.

In addition, one SS-block may have the QCL relationship with several CSI-RS resource sets. The terminal may search for a terminal beam suitable for reception of the CSI-RS resources associated with the SS-block based on SS-block received signal strength.

The following Table 7 is an example of defining two resource sets by using the density reduction parameters, in which "Alt 3) gap between resource groups" is set by density reduction method. The RE mapping pattern of the CSI-RS as shown in the following Table 7 is illustrated in FIG. 12.

Figure 12:
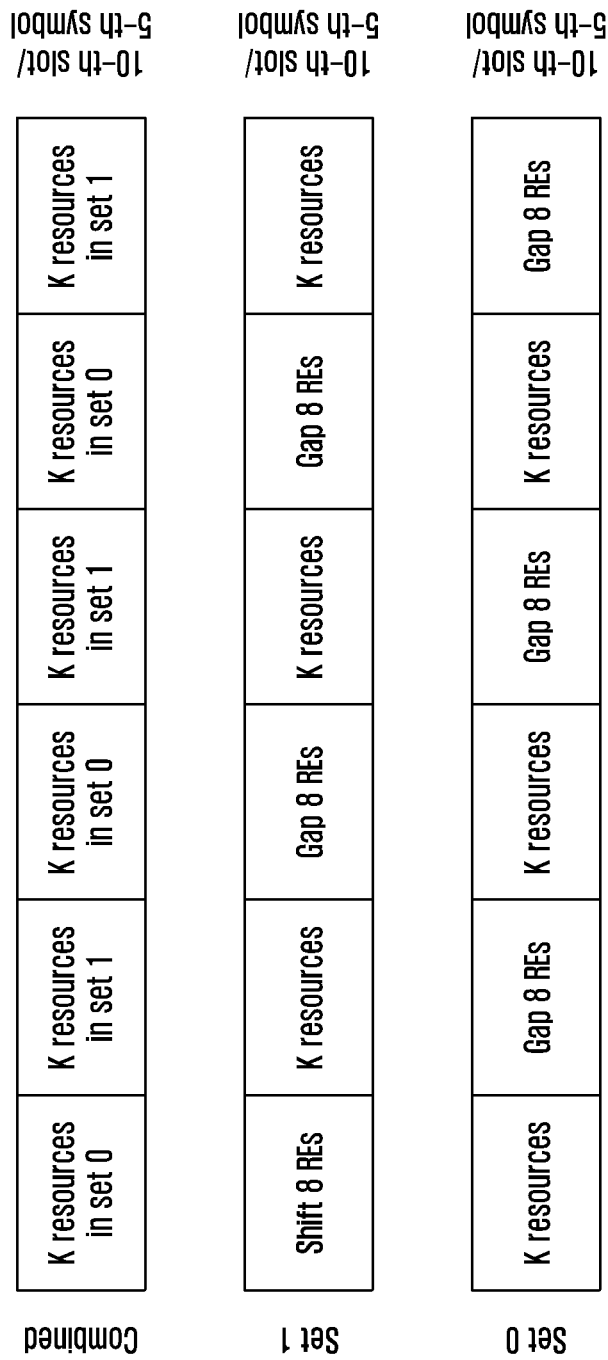
FIG. 12 is a diagram illustrating an embodiment of an RE mapping pattern of CSI-RS according to an embodiment of the disclosure.

FIG. 12 is a diagram illustrating an embodiment of an RE mapping pattern of CSI-RS according to an embodiment of the disclosure.

Referring to FIG. 12, the two sets are each configured at the same slot/symbol location, and the gap and the shift value are set to be 8 REs, which is occupied by one resource group, in order to avoid overlap between the resource groups belonging to different sets.

TABLE 7

CSI-RS resource setting (Common part)

- Type: Beam management
- QCL info: SS block index 0
- Resource allocation: 10-th Slot, 5-th Symbol, N = 1
- Time-domain repetition indicator: 0
- Number of resources per symbol (K): 4
- Number of antenna ports per resource: 2
- Sub-carrier spacing (f_s): 240 KHz
- Sub-time unit order (L): 1
- Tx period: 10 ms periodic
- Density reduction parameter: Gap = 8 REs
- "Alt-3" is configured for density reduction method CSI-RS resource setting (Set-specific part)

- Set index: 0
- Density reduction parameter: Shift value = 0-th RE
- Set index: 1
- Density reduction parameter: Shift value = 8-th RE For example, the following Table 8 shows an example in which four resource sets are defined in one symbol using the density reduction parameters, and the RE mapping pattern of the corresponding CSI-RS is illustrated in FIG. 13.

Figure 13:
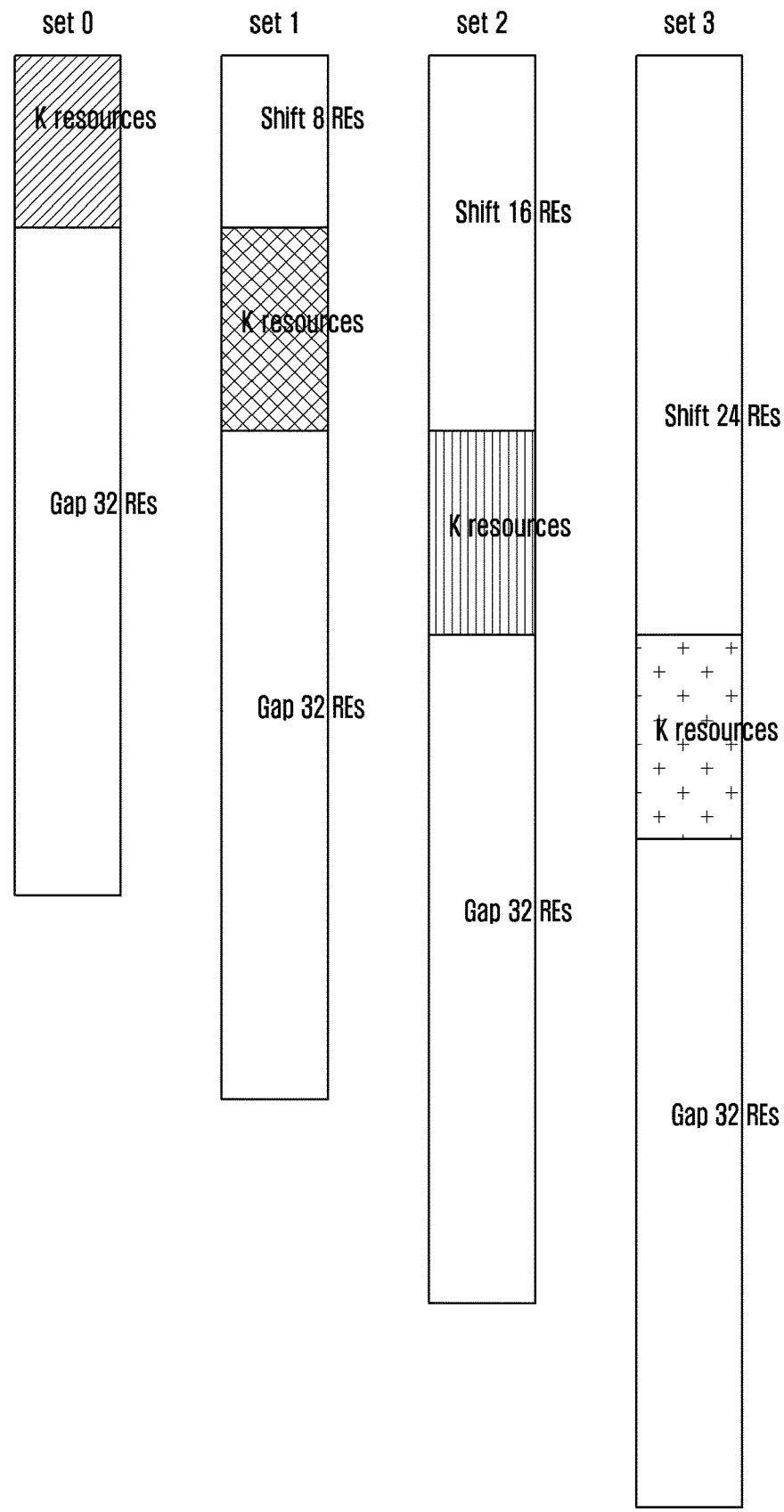
FIG. 13 is a diagram illustrating an embodiment of an RE mapping pattern of a CSI-RS according to an embodiment of the disclosure.

FIG. 13 is a diagram illustrating an embodiment of an RE mapping pattern of the CSI-RS according to an embodiment of the disclosure.

TABLE 8

CSI-RS resource setting (Common part)

- Type: Beam management
- QCL info: SS block index 0
- Resource allocation: 10-th Slot, 5-th Symbol, N = 1
- Time-domain repetition indicator: 0
- Number of resources per symbol (K): 4
- Number of antenna ports per resource: 2
- Sub-carrier spacing (f_s): 240 KHz
- Sub-time unit order (L): 1
- Tx period: 10 ms periodic
- Density reduction parameter: Gap = 32 REs
- "Alt-3" is configured for density reduction method CSI-RS resource setting (Set-specific part)

- Set index: 0
- Density reduction parameter: Shift value = 0-th RE
- Set index: 1
- Density reduction parameter: Shift value = 8-th RE
- Set index: 2
- Density reduction parameter: Shift value = 16-th RE
- Set index: 3
- Density reduction parameter: Shift value = 24-th RE Referring to FIG. 13, for example, the following Table 9 is an example in which two resource sets are defined in one symbol by using the density reduction parameter. At this time, "Alt-2" which defines the gap between resources is used. In this case, to avoid the overlap between the resources belonging to the two sets, the RE number of resources occupied by one resource is 2, which is set for the gap and the shift value. The RE mapping pattern of the corresponding CSI-RS is illustrated in FIG. 14.

FIG. 14 is a diagram illustrating an embodiment of an RE mapping pattern of a CSI-RS according to an embodiment of the disclosure.

TABLE 9

CSI-RS resource setting (Common part)

- Type: Beam management
- QCL info: SS block index 0
- Resource allocation: 10-th Slot, 5-th Symbol, N = 1
- Time-domain repetition indicator: 0
- Number of resources per symbol (K): 4
- Number of antenna ports per resource: 2
- Sub-carrier spacing (f_s): 240 KHz
- Sub-time unit order (L): 1
- Tx period: 10 ms periodic
- Density reduction parameter: Gap = 2 REs
'- "Alt-2" is configured for density reduction method CSI-RS resource setting (Set-specific part)

- Set index: 0
- Density reduction parameter: Shift value = 0-th RE
- Set index: 1
- Density reduction parameter: Shift value = 2-th RE Referring to FIG. 14, several resource sets may be transmitted while being mapped to one OFDM symbol using the above-described density reduction method. The resource set may be used for the CSI-RSs transmitted in different total radiated powers (TRPs). The NW may be set in the terminal to activate measurement and reporting only for some resource sets. In addition, the NW may be set in the terminal to activate the measurement and reporting on the resource set having the QCL relationship with the corresponding SS-block index based on the SS-block index received from the terminal.

The following Table 10 shows the sub-time unit setting method. If the sub-time unit order (L) value is set, the RE for the CSI-RS is mapped at intervals of L×f_s using the IFDMA method.

Figure 15:
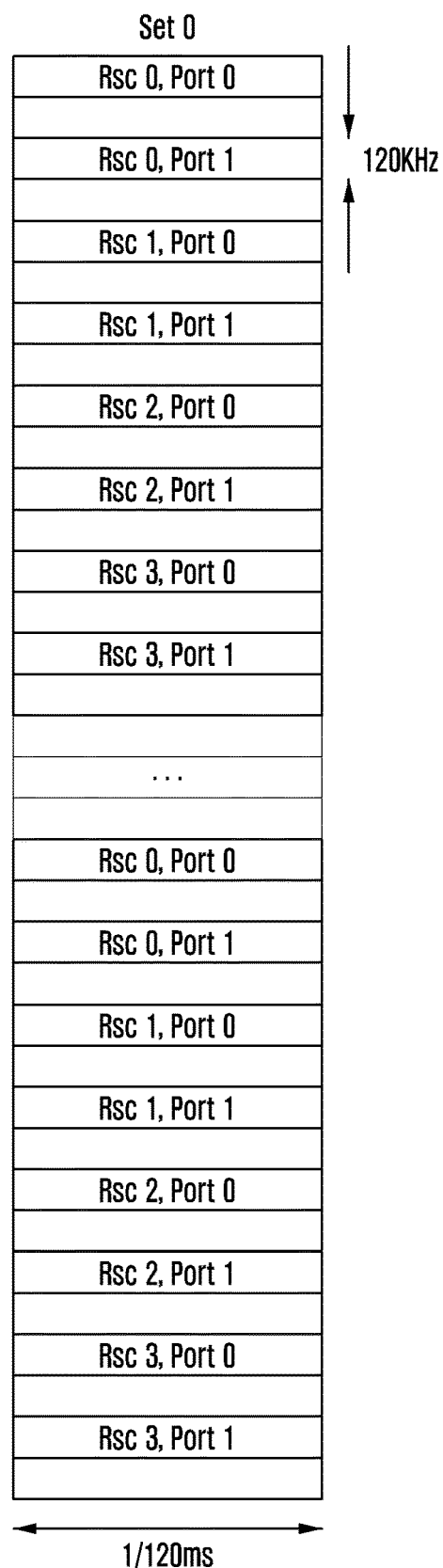
FIG. 15 is a diagram illustrating mapping of one CSI-RS for each two Res according to an embodiment of the disclosure.

FIG. 15 is a diagram illustrating mapping of one CSI-RS for each two REs according to an embodiment of the disclosure.

Referring to FIG. 15, for example, when L=2 and f_s=120 KHz, as illustrated in FIG. 15, one Cs-RS is mapped to each two REs. At this time, one RE has a size of 120 KHz. As described above, one time-unit length is defined by "1/120 ms" based on the set f_s value. A time-axis signal repeated L times in the time-unit is observed. The terminal may perform Rx beam sweeping up to L times within the time-unit. The sub-time unit order (L) value may be more dynamically signaled through the MAC CE.

TABLE 10

CSI-RS resource setting

Type: Beam management
Set index: 0
QCL info: SS block index 0
Resource allocation: 10-th Slot, 5-th Symbol, N = 1
Time-domain repetition indicator: 0
Number of resources per symbol (K): 4
Number of antenna ports per resource: 2
Sub-carrier spacing (f_s): 120 KHz
Sub-time unit order (L): 2
Tx period: 10 ms periodic
Density reduction parameter: Gap = 0 REs, Shift value = 0-th RE The following Table 11 is an example that may be used only for the P1 BM without Tracking RS support. The specific CSI-RS allocation results according to the following embodiment are illustrated in FIGS. 16 and 17.

FIG. 16 is a diagram illustrating an embodiment that may be used only for P1 BM without tracking RS support according to an embodiment of the disclosure.

FIG. 17 is a diagram illustrating an embodiment that may be used only for P1 BM without a tracking RS support according to an embodiment of the disclosure.

Referring to FIG. 16, the CSI-RS resource sets 0, 1, 2, and 3 each have a QCL relationship with the SS block indexes 0, 1, 2, and 3. At this time, it means that at least one terminal beam of the L terminal beams searched in the SS block having the QCL relationship may be used in the CSI-RS having the QCL relationship.

Referring to FIG. 17, in addition, since two OFDM symbols are used in each resource set and 8 resources are set per symbol, a total of 16 CSI-RS resources are repeatedly allocated on the frequency base in one resource as illustrated in FIG. 17. Since a total of 4 resource sets are set, so that a total of 64 CSI-RS resources may be set in the terminal through the setting as illustrated in the following Table 11.

TABLE 11

CSI-RS resource setting (Common part)

Type: Beam management
Time-domain repetition indicator: 0
Number of resources per symbol (K): 8
Number of antenna ports per resource: 1
Sub-carrier spacing (f_s): 240 KHz
Sub-time unit order (L): 1
Tx period: 10 ms periodic
Density reduction parameter: Gap = 0 REs, Shift value = 0-th RE CSI-RS resource setting (Set-specific part)

Set index: 0
QCL info: SS block index 0
Resource allocation: 10-th Slot, 5-th Symbol, N = 2
Set index: 1
QCL info: SS block index 1
Resource allocation: 10-th Slot, 7-th Symbol, N = 2
Set index: 2
QCL info: SS block index 2
Resource allocation: 10-th Slot, 9-th Symbol, N = 2
Set index: 3
QCL info: SS block index 3
Resource allocation: 10-th Slot, 11-th Symbol, N = 2

The following Table 12 shows an embodiment supporting time-domain repetition. The specific CSI-RS allocation results according to the following embodiment are illustrated in FIG. 18.

FIG. 18 is a diagram illustrating an embodiment that supports time-domain repetition according to an embodiment of the disclosure.

Referring to FIG. 18, since the time-domain repetition indicator value is set to be 1, as shown in FIG. 18, the resource set defined in one OFDM symbol based on the sub-carrier spacing (f_s) 240 KHz is repeatedly transmitted over N symbols. For example, the base station transmits the same resource set N times using the same Tx beam over N symbols, and the terminal may perform an Rx beam sweeping (P3 BM) operation corresponding to a maximum of N×L times.

TABLE 12

CSI-RS resource setting (Common part)

Type: Beam management
Time-domain repetition indicator: 1
Number of resources per symbol (K): 8
Number of antenna ports per resource: 1
Sub-carrier spacing (f_s): 240 KHz
Sub-time unit order (L): 1

TABLE 12-continued

Tx period: 10 ms periodic
Density reduction parameter: Gap = 0 REs, Shift value = 0-th RE CSI-RS resource setting (Set-specific part)

Set index: 0
QCL info: SS block index 0
Resource allocation: 10-th Slot, 5-th Symbol, N = 2
Set index: 1
QCL info : SS block index 1
Resource allocation: 10-th Slot, 7-th Symbol, N = 2
Set index: 2
QCL info : SS block index 2
Resource allocation: 10-th Slot, 9-th Symbol, N = 2
Set index: 3
QCL info: SS block index 3
Resource allocation: 10-th Slot, 11-th Symbol, N = 2

FIG. 19 is a diagram illustrating an RE mapping pattern of a CSI-RS as shown in the following Table 13, in which a case in which the CDM is not applied between resources is illustrated according to an embodiment of the disclosure.

Referring to FIG. 19, on the other hand, when P=2, the following signals are applied to two REs allocated to one resource depending on whether the CDM is applied between the antenna ports.

$X_k = [x_k; 0]$, $Y_k = [0; y_k]$ are applied if CDM between antenna ports is not applied.

$X_k = [x_k; x_k]$, $Y_k = [y_k; -y_k]$ are applied if CDM between antenna ports is applied.

The method of generating $X_k$ and $Y_k$ signals according to whether the CDM is applied between the antenna ports is similarly applied to the following embodiments and FIGS. 19 to 23.

TABLE 13

CSI-RS resource setting

Type: Beam management
Set index: 0
QCL info: SS block index 0
Resource allocation: ( )-th Slot, ( )-th Symbol, N = 1
Time-domain repetition indicator: 0
Number of resources per symbol (K): 4
CDM between K resources is not applied
Number of antenna ports per resource (P): 2
Sub-carrier spacing (f_s): 240 KHz
Sub-time unit order (L): 1
Tx period: 10 ms periodic
Density reduction parameter: Gap = 0 REs, Shift value = 0-th RE FIG. 20 is a diagram illustrating an RE mapping pattern of a CSI-RS, in which a case in which a CDM is applied between resources is illustrated according to an embodiment of the disclosure.

Referring to FIG. 20, an RE mapping pattern of a CSI-RS is illustrated in the following Table 14, in which a case in which a CDM is applied between resources.

When the CDM is applied, one resource is mapped over 2K REs, and the transmission signal $X_k$ of antenna port No. 0 and the transmission signal $Y_k$ of antenna port No. 1 for the k-th resource are as follows.

$X_k = [a_k X_0; b_k X_1; c_k X_2; d_k X_3;]$, $Y_k = [a_k Y_0; b_k Y_1; c_k Y_2; d_k Y_3;]$ $[a_0; b_0; c_0; d_0] = [1; 1; 1; 1]$
$[a_1; b_1; c_1; d_1] = [1; -1; 1; -1]$
$[a_2; b_2; c_2; d_2] = [1; 1; -1; -1]$
$[a_3; b_3; c_3; d_3] = [1; -1; -1; 1]$

TABLE 14

CSI-RS resource setting

Type: Beam management
Set index: 0
QCL info: SS block index 0
Resource allocation: ( )-th Slot, ( )-th Symbol, N = 1
Time-domain repetition indicator: 0
Number of resources per symbol (K): 4
CDM between K resources is applied
Number of antenna ports per resource (P): 2
Sub-carrier spacing (f_s): 240 KHz
Sub-time unit order (L): 1
Tx period: 10 ms periodic
Density reduction parameter: Gap = 0 REs, Shift value = 0-th RE FIG. 21 is a diagram illustrating an RE mapping pattern of a CSI-RS, and illustrates a case in which CDM is not applied between resources according to an embodiment of the disclosure.

Referring to FIG. 21, an RE mapping pattern of a CSI-RS is illustrated in the following Table 15, in which a case in which the CDM is not applied between resources. In FIG. 21, the RE index in which resources are mapped by the IFDM scheme when the L value is greater than 1.

TABLE 15

CSI-RS resource setting

Type: Beam management
Set index: 0
QCL info: SS block index 0
Resource allocation: ( )-th Slot, ( )-th Symbol, N
Time-domain repetition indicator: 0
Number of resources per symbol (K): 4
CDM between K resources is not applied
Number of antenna ports per resource (P): 2
Sub-carrier spacing (f_s): 240 KHz
Sub-time unit order (L): L> 1
Tx period: 10 ms periodic
Density reduction parameter: Gap = 0 REs, Shift value = 0-th RE FIGS. 22 and 23 illustrate an embodiment defining several resource sets in one OFDM symbol according to an embodiment of the disclosure.

Referring to FIG. 22, a case in which two resource sets are set in one OFDM according to Table 16 is illustrated. For example, the k+1-th resource and the k-th resource belonging to the same set is subjected to the RE mapping while being spaced by gap=2 REs. In addition, in order to avoid the RE mapping overlapping between different sets, they have different RE mapping start indexes (=Shift values) for each set, and these values are set differently for each set by the shift value. In general, when SFDM resource sets are set in one OFDM symbol, gap=P×($S_{FDM}$−1) REs can be commonly set for all sets, and the shift value may be set for each set as 0 RE, P REs, . . . , P ($S_{FDM}$−1) REs.

TABLE 16

CSI-RS resource setting

Type: Beam management
QCL info: SS block index 0
Resource allocation: ( )-th Slot, ( )-th Symbol, N = 1
Time-domain repetition indicator: 0
Number of resources per symbol (K): 4
CDM between K resources is not applied
Number of antenna ports per resource (P): 2
Sub-carrier spacing (f_s): 240 KHz
Sub-time unit order (L): 1

TABLE 16-continued

Tx period: 10 ms periodic
Density reduction method: Gap = 2 REs
Gap between resources is applied CSI-RS resource setting (Set-specific part)

Set index: 0
Density reduction parameter: Shift value = RE
Set index: 1
Density reduction parameter: Shift value = 2 REs FIG. 23 is a diagram illustrating a case in which two resource sets are set in one OFDM according to an embodiment of the disclosure.

Referring to FIG. 23, according to Table 17, in which a case in which the gap between the resource groups is set between two sets for FDM. Here, the resource group means K resources which consists of resource indexes 0, 1, . . . , K−1 and is consecutive on the frequency axis. For example, the RE mapping is performed between the resource groups belonging to the same set while being spaced by gap=8 REs. In addition, in order to avoid the RE mapping overlapping between different sets, they have different RE mapping start indexes (=Shift values) for each set, and these values are set differently for each set. In general, when the SFDM resource sets are set in one OFDM symbol, gap=P×K×($S_{FDM}$−1) REs may be commonly set for all sets, and the shift value may be set for each set as 0 RE, P ? K REs, . . . , P×K×($S_{FDM}$−1) REs.

TABLE 17

CSI-RS resource setting

Type: Beam management
QCL info: SS block index 0
Resource allocation: ( )-th Slot, ( )-th Symbol, N = 1
Time-domain repetition indicator : 0
Number of resources per symbol (K): 4
CDM between K resources is not applied
Number of antenna ports per resource (P): 2
Sub-carrier spacing (f_s): 240 KHz
Sub-time unit order (L): 1
Tx period: 10 ms periodic
Density reduction method: Gap = 8 REs
Gap between resource groups is applied CSI-RS resource setting (Set-specific part)

Set index: 0
Density reduction parameter: Shift value = 0 RE
Set index: 1
Density reduction parameter: Shift value = 8 REs Meanwhile, the CSI-RS resource setting proposed in the disclosure may consist of parameters as shown in the following Table 18. The parameters indicated by (1) in the following Table 18 may be implicitly determined in a specific type of configuration method (e.g., cell-specifically configured). Meanwhile, the parameters indicated by the above (1) may be explicitly indicated by the base station in another type of configuration method (e.g., UE-specifically configured). The gap and the shift value may be automatically determined depending on the value of the parameter $S_{FDM}$ indicated by the above (2).

Gap="P×($S_{FDM}$−1)" REs
Shift="P×(j−1)" REs for the j-th FDMed set

In this case, the gap is regarded as a parameter indicating the separation between the resources belonging to the same set, and the shift value is regarded as an index which starts RE mapping and has the same values as j=1, 2, . . . , $S_{FDM}$.

According to another embodiment of the disclosure, the gap and the shift value may be automatically determined as follows depending on the value of the parameter $S_{FDM}$ indicated by the above (2). At this time, the gap is regarded as the parameter indicating how frequently the resource group is repeatedly mapped, having how far the resource group is spaced apart from the frequency base.

Gap="P×($S_{FDM}$−1)" REs
Shift="P×(j−1)" REs for the j-th FDMed set

The symbol index indicated in the resource allocation shown in the following Table 18 indicates a symbol index at which the RE mapping for S sets starts.

The CSI-RS set based on the parameters shown in the following Table 18 has the following characteristics.

RE mapping pattern may be defined within a configured CSI-RS BW regardless of RB grid.

For some use cases (e.g., P1 BM), OFDM symbol is configured with CSI-RS only within a configured CSI-RS BW.

A resource set can be defined within N OFDM symbols which comprise NK resources.

(FFS N>1 is needed in NR spec. If it is needed, N may be configurable parameter)

Each resource can represent a beam identity of a specific TRP.

Multiple resource sets may be configured in a single resource setting, and they can share the same RE mapping pattern.

Multiple resource sets may be configured in N OFDM symbol with FDM manner.

Sub-time unit details

Time-unit is determined by indicated SCS, and tx beams may be changed between time-units (i.e., within a time-unit, tx beams are not changed)

Number of sub-time units in a time-unit is defined by indicated repetition factor (e.g., 1, 2, 4), and Rx beams may be changed across sub-time units IFDM is used for partitioning method of sub-time units

TABLE 18

Total number of configured resource sets[(1)]: S
Resource allocation[(1)]: Slot index & Symbol index
Number of symbols per resource set[(1)]: N
Number of antenna ports per resource (P) and number of resources per symbol (K):
Option 1 (resource based beam identity): P = {1, 2} and K = {2, 4, 8}
Option 2 (port & resource based beam identity): P = {2, 4, 8, 16}
Time-domain repetition indicator for N symbols
If repetition is activated, a resource set in one OFDM symbol is repeated in N symbols
If repetition is not activated, N × K resources are defined in a resource set within N symbols
Sub-carrier spacing (f_s[(1)]) for a time-unit & Number of sub-time unit per time-unit (L[(1)])

| Index | 0 | 1 | 2 | 3 | 4 | 5 |
|---|---|---|---|---|---|---|
| f_s [KHz] | 60 | 60 | 60 | 120 | 120 | 240 |
| L | 1 | 2 | 4 | 1 | 2 | 1 |

Tx period: {5, 10, 20 ms} periodic
Number of FDMed resource sets in a OFDM symbol[(2)]: $S_{FDM}$ Meanwhile, unlike the method shown in the Table 18, the following Table 19 may be used as a method of configuring f_s value and L values. Here, J fSS-block means sub-carrier spacing used for the SS-block transmission.

FIGS. 24, 25, 26, 27, 28, and 29 are diagrams illustrating a resource index and a resource set index of the CSI-RS transmitted in one slot according to various embodiments of the disclosure.

TABLE 19

| Configuration index | 0 | 1 | 2 | 3 | 4 | 5 |
|---|---|---|---|---|---|---|
| $f_s$ | $1/4 \times f_{SS\text{-}block}$ | $1/4 \times f_{SS\text{-}block}$ | $1/4 \times f_{SS\text{-}block}$ | $1/2 \times f_{SS\text{-}block}$ | $1/2 \times f_{SS\text{-}block}$ | $f_{SS\text{-}block}$ |
| L | 1 | 2 | 4 | 1 | 2 | 1 |

Referring to FIG. 24, in the case of N=1, K=4, P=2, L=1, f_s=data channel SCS, SFDM=1, and S=14, the resource index and the resource set index of the CSI-RS transmitted in one slot are indicated.

Referring to FIG. 25, in the case of N=1, K=8, P=2, L=1, f_s=data channel SCS, SFDM=1, and S=14, the resource index and the resource set index of the CSI-RS transmitted in one slot are indicated.

Referring to FIG. 26, in the case of N=1, K=4, P=2, L=2, f_s=data channel SCS, SFDM=1, and S=14, the resource index and the resource set index of the CSI-RS transmitted in one slot are indicated.

Referring to FIG. 28, in the case of N=2, K=4, P=2, L=1, f_s=data channel SCS, SFDM=1, and S=7, the resource index and the resource set index of the CSI-RS transmitted in one slot are indicated. In this case, "Time-domain repetition indicator for N symbols" may be set to be OFF.

Referring to FIG. 29, in the case of N=2, K=4, P=2, L=1, f_s=data channel SCS, SFDM=1, and S=7, the resource index and the resource set index of the CSI-RS transmitted in one slot are indicated. In this case, "Time-domain repetition indicator for N symbols" may be set to be ON.

Fourth Embodiment: Activation Request of SP-CSI-RS Resource

Based on the resource setting method described above, the base station can operate the CSI-RS configured by two different schemes as illustrated in the following Table 20. In this case, the CSI-RS cell-specifically configured may be used in the MIB or SIB for the P1 BM, and the CSI-RS UE-specifically configured may be used in the RRC for the P2 BM. The CSI-RS for the P1 BM may be UE-specifically configured using the RRC. The CSI-RS for the P1 BM may include resource sets as many as the SS-blocks transmitted by the base station. For example, if the base station periodically transmits a total of T SS-blocks corresponding to index 0, 1, . . . , T−1, the base station may periodically transmit the CSI-RS resource sets corresponding to the resource set indexes 0, 1, . . . , T−1 for the P1 BM.

A semi-persistent transmission scheme is established in the base station for the cell-specifically configured CSI-RS resource sets, and the information on whether each resource set is activated may be broadcast to the terminals in the SIB. The information on whether each resource set is activated may use a bitmap having a size corresponding to the number of resource sets configured in the corresponding cell. For example, when a total of 64 resource sets are configured, the base station may use a bitmap having 64 bits to indicate an index corresponding to an activated resource set by 1, and an index corresponding to a deactivated resource set by 0 The terminals may perform measurement and reporting on the activated resource set. In addition, the terminal may measure the received signal strength of the SS block and determine the best SS block index based on the received signal strength. When the CSI-RS resource set having the QCL relationship with the best SS block index is in the deactivation state, the terminal may transmit information requesting the activation of the corresponding CSI-RS resource set to the base station. The CSI-RS may be UE-specifically configured using the RRC. It may be UE-specifically transmitted whether each CSI-RS resource set is activated through the RRC signaling or the MAC CE. The base station may use a bitmap having a length T to transmit the information on whether the CSI-RS resource sets corresponding to the CSI-RS resource set indexes 0, 1, . . . , T−1 for the P1 BM is activated to the terminal as shown in the following Table 22. For example, when the CSI-RS resource set corresponding to an index t is activated, a t-th bit value of the bitmap having the length T has "1", and when a CSI-RS resource set corresponding to the index t is deactivated, the t-th bit value of the bitmap having the length T has "0".

TABLE 22

CSI-RS_active= {00111010 . . . . . . . 0}

Meanwhile, the UE-specifically configured CSI-RS may be used for the P2 BM. If the CSI-RS for the P1 BM is cell-specifically configured, the QCL information with the cell-specifically configured CSI-RS resource set as described in option 2 of the following Table 20 in the resource setting of the CSI-RS for the P2 BM may be included. Meanwhile, the base station may include the QCL information with the SS-block as described in option 1 of the following Table 20 in the resource setting of the CSI-RS for the P2 BM.

According to another embodiment of the disclosure, the CSI-RS for the P1 BM as shown in the following Table 21 may be UE-specifically configured using dedicated RRC signaling.

Figure 31:
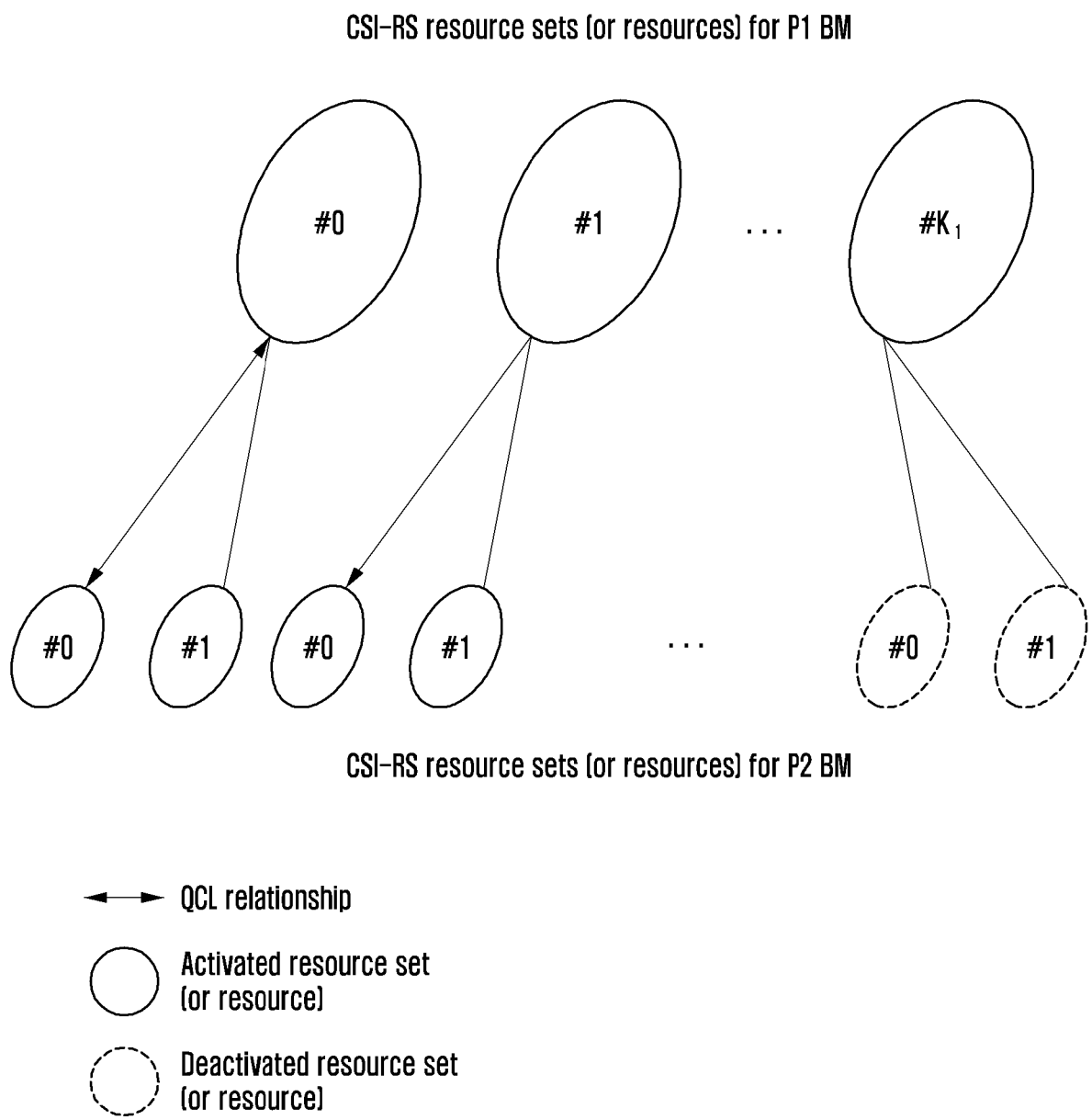
FIG. 31 is a diagram illustrating QCL information between K1 CSI-RS resources for P1 BM and K2 resources for P2 BM according to an embodiment of the disclosure.

FIG. 31 is a diagram illustrating QCL information between K1 CSI-RS resources for P1 BM and K2 resources for P2 BM according to an embodiment of the disclosure.

Referring to FIG. 31, some of the P2 BM resources can be set to be in the deactivated state. The terminal may select the best CSI-RS resource index by performing the beam search on the K1 CSI-RS resources for the P1 BM. In addition, the information on whether the corresponding CSI-RS resource having a P2 level is set to be in the activation state may be identified by the QCL relationship with the selected CSI-RS resource index having a P1 level. If the CSI-RS resource having the P2 level is set to be in the deactivation state, the terminal may request the activation of the corresponding resource to the base station. The operation of the base station and the terminal associated therewith is shown in FIGS. 3A and 3B. The base station sets the CSI-RS resource (or resource set) for the P1 BM and the CSI-RS resource (or resource set) for the P2 BM in the terminal and indicates whether each resource (or resource set) is activated to the terminal. The terminal performs the beam search on the resource (or resource set) having the P1 level which is set to be in the activation state to select the resource (or resource set) corresponding to the best beam. It is identified whether the corresponding resource (or resource set) having the P2 level is set to be in the activation state by the QCL relationship with the selected resource (or resource set) having the P1 level. If the resource (or resource set) having the P2 level is set to be in the deactivation state, the terminal may transmit to the base station the signaling requesting the switching to the activation state for the resource (or resource set) having the P2 level. In this embodiment of the disclosure, the beam search and the best index selection for the CSI-RS for the P1 BM may be replaced with the beam search and the best index selection for the SS-block for the P1 BM. At this time, the base station may notify the terminal of the QCL information between the SS-block index of the P1 BM and the resource (or resource set) for the P2 BM, and the terminal may use the QCL information to transmit to the base station the signaling requesting the switching to the activation state for the resource (or resource set) having the P2 level by the same method.

When the QCL relationship between the SS block and the SP-CSI-RS is defined, the terminal may perform the activation request or the deactivation request for the SP-CSI-RS resource set based on the measurement information on the SS block. The request may be transmitted in the form of the MAC CE. If the base station periodically transmits the SS-blocks corresponding to the SS-block indexes 0, 1, ..., T, the base station may transmit to the terminal the information on whether the CSI-RS resource sets corresponding to the CSI-RS resource set indexes 0, 1, ..., T for the P1 BM is activated using the bit map having the length T. For example, if the t-th CSI-RS resource set is activated, the t-th bit value of the bitmap having the length T has "1", and if the t-th CSI-RS resource set is deactivated, the t-th bit value of the bitmap having the length T has "0".

The number of CSI-RS resource sets in the activation state set in one terminal may be set to be K by the base station, where K<=T. The index set of the SS blocks corresponding to the currently set K active CSI-RS resource sets is defined as follows.

SS_active={i1, i2, ..., iK}

The base station may explicitly transmit the information on the SS_active set to the terminal. Alternatively, the terminal may implicitly identify the information on the SS_active set based on the index information of the SS block corresponding to the activated SP-CSI-RS resource set by the QCL relationship. The set of the indexes that are not included in the SS_active among all the T SS block indexes is named the SS_deactive in the following description.

In the following description, RSRP_i refers to the RSRP value measured by the terminal for the SS block corresponding to an SS block index i.

[Method 1a]
The terminal selects N SS blocks corresponding to the upper N RSRP values based on the measured RSRP values of all SS blocks. At this time, the base station may set a value corresponding to N. (e.g., N=1).
The terminal configures as a Request_SS_active set the indexes that are not included in the SS_active set among the selected upper N SS block indexes.
Reporting method of Request_SS_active set
  Method 1) When the base station requests reporting, the terminal transmits the reporting. The transmission for the reporting may be performed periodically or may be transmitted aperiodically only when the base station requests the reporting.
  Method 2) When the number of indexes included in the Request_SS_active set configured by the terminal is equal to or greater than the N_reporting number, the terminal transmits the Request_SS_active set to the base station through the MAC CE.
  The N_reporting value may be preset by the base station through the RRC or the MAC CE.
When the information on the Request_SS_active set is reported, all or some of the following information included in the following Table 23 may be transmitted to the base station.

TABLE 23

Request_SS_active set
RSRP values measured for the SS blocks corresponding to the index included in the SS_active
RSRP values measured for the SS blocks corresponding to the index included in the Request_SS_active set

[Method 1b]
The highest value among the RSRP values measured by the terminal for the SS blocks corresponding to the indexes included in the SS_active set is defined as reference RSRP as shown the following Equation (1).

$$RSRP\_Ref = Max(RSRP\_i) \text{ for all } i \in SS\_active \qquad \text{Equation 1}$$

Among the RSRP measurement values for the SS blocks corresponding to the index included in the SS_deactive set, the indexes of the SS blocks corresponding to the RSRP values higher above the threshold set by the base station than the reference RSRP value is configured as the Request_SS_active set (see Table 24).

TABLE 24

Request_SS_active= {j | RSRP_j > RSRP_ref+ Threshold} for all j ∈ SS_deactive

If the SS_block_index equal to or greater than the N_reporting number is included in the Request_SS_active set, the terminal transmits the Request_SS_active set to the base station using the MAC CE.
  The N_reporting value may be preset by the base station through the RRC or the MAC CE.
In the above embodiment of the disclosure, the value for the "RSRP_ref" may be set to be a specific value in advance by the base station.

In the above embodiment of the disclosure, the base station may change the SP-CSI-RS currently set in the deactivation state to the activation state based on the Request_SS_active reporting and set it. The change of the activation setting may be performed by the MAC-CE, and the terminal can update the SS_active set and the Request_SS_active set based on the changed setting.

According to another embodiment of the disclosure, one SS block index may have the QCL relationship with one or more SP-CSI-RS resources. The QCL relationship may be transmitted to the terminal in advance through the RRC or MAC CE. The total number of SS blocks transmitted periodically by the base station may be smaller than the T2 value described below.

The base station may use the bitmap message having the length T2 as shown in the following Table 22 to transmit whether the CSI-RS is activated to the terminal. At this time, when the t-th CSI-RS resource is activated, the t-th bit value of the bitmap having the length T2 has "1", and when the t-th CSI-RS resource is deactivated, the t-th bit value of the bitmap having the length T2 has "0".

[Method 2a]
The terminal selects N SS blocks corresponding to the upper N RSRP values based on the measured RSRP values of all SS blocks. At this time, the base station may set a value corresponding to N. (e.g., N=1).

The terminal selects the CSI-RS resource indexes having the QCL relationship with the upper N SS block indexes.

The indexes of the CSI-RS resource sets in the deactivation state among the selected CSI-RS resource indexes are collected and configured as the Request_CSI-RS_active set as shown the following Table 25.

When the number of indexes included in the Request_SS_active set configured by the terminal is equal to or greater than the N_reporting number, the terminal transmits the Request_SS_active set to the base station through the MAC CE.

The N_reporting value may be preset by the base station through the RRC or the MAC CE.

TABLE 25

Request_CSI-RS_active= {CRI_j1, CRI_j2..., }

In the following description, the CSI-RS_RSRP_i refers to the RSRP value obtained by averaging the RSRP values measured by the terminal in all antenna ports included in the CSI-RS resource corresponding to the CSI-RS resource index i. In the following description, it is assumed that the terminal may measure the RSRP value for the deactivated CSI-RS. In order to measure the RSRP value of the terminal, the base station may transmit to the terminal the information on whether the RSRP value can be measured in the deactivated CSI-RS to the MS.

[Method 2c]
The terminal defines the highest value among the RSRP measurement values for the activated CSI-RS resources as the reference RSRP.

RSRP_ref=max(CSI-RS_RSRP_i) for all CRI i's corresponding to the activated CSI-RS resources    Equation 2

The RSRP measurement is performed on the deactivated CSI-RS resources, and the index of the CSI-RS resource corresponding to the RSRP values higher than the reference RSRP value of the above Equation 2 above the threshold set by the base station is configured as the Request_CSI-RS_active set as shown in the following Table 26.

When the number of indexes included in the Request_SS_active set configured by the terminal is equal to or greater than the N_reporting number, the terminal transmits the Request_SS_active set to the base station through the MAC CE.

TABLE 26

The N_reporting value may be preset by the base station through the RRC or the MAC CE.

In the above embodiment of the disclosure, the value for the "RSRP_ref" may be set to be a specific value in advance by the base station.

Fifth Embodiment: OFDM Symbol Used for Dedicated CSI-RS Transmission

The terminal may assume that the signal/channel other than the CSI-RS is not FDMed in the OFDM symbol in which the CSI-RS resource for the P1 or P2 BM is configured. For example, the terminal receiving the PDSCH scheduling for the slot including the OFDM symbol in which the CSI-RS is configured may perform decoding on the assumption that the PDSCH signal is transmitted only to the remaining symbols other than the corresponding OFDM symbol in a slot. Meanwhile, if the transmission for the CSI-RS resource set is deactivated, the terminal may assume that another signal/channel other than the CSI-RS is transmitted to the OFDM symbol in which the corresponding CSI-RS is configured. For example, the terminal receiving the PDSCH scheduling for the slot including the OFDM symbol in which the deactivated CSI-RS resource set is configured may perform decoding on the assumption that the PDSCH signal is transmitted even to the corresponding OFDM symbol in a slot.

Figure 30:
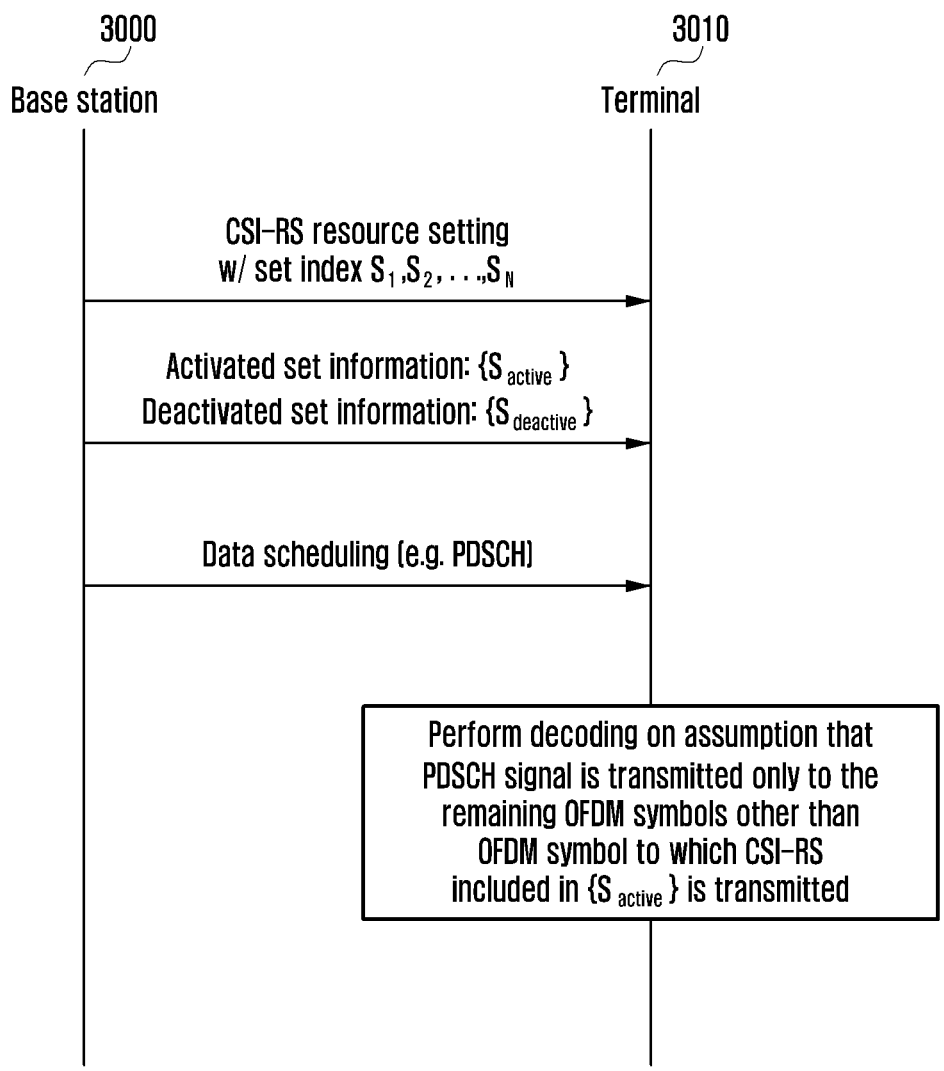
FIG. 30 is a diagram illustrating a process of performing resource setting having an index of S1, S2, . . . , SN according to an embodiment of the disclosure.

FIG. 30 is a diagram illustrating a process of performing resource setting having an index of S1, S2, . . . , SN according to an embodiment of the disclosure.

Referring to FIG. 30, a base station 3000 may perform resource setting having indexes of S1, S2, . . . , SN. The information on the resource set index set in the activation state in which a double transmission is actually performed may be transmitted to the terminal 3010 as {Sactive}. When the terminal 3010 receives scheduling from the base station 3000 in a slot in which the resource set belonging to the received {Sactive} index set is set, the terminal 3010 may perform decoding on the assumption that the PDSCH signal is transmitted only to the remaining symbols other than the OFDM symbol in the slot. The base station 3000 may dynamically indicate the {Sactive} information to the terminal 3010 whenever the {Sactive} information is updated. The base station 3000 may set the CSI-RS BW to which the CSI-RS is transmitted for each resource set when performing the resource setting. The CSI-RS BW may be different for each resource set, or the same CSI-RS BW may be set for each resource set. When the terminal 3010 is in the active state for the resource set in which the CSI-RS BW is set, the terminal 3010 may perform decoding on the assumption that the PDSCH is transmitted to the OFDM symbol in which the resource set is configured in the remaining frequency period other than the CSI-RS BW. Meanwhile, the base station 3000 may set whether the FDM transmission of the CSI-RS and the PDSCH is possible for each resource set when performing the resource setting. For example, for the resource set which is set to disable the FDM transmission of the CSI-RS and the PDSCH, the decoding may be performed on the assumption that the PDSCH is not transmitted to the entire system BW or the configured CSI-RS BW in the OFDM symbol in which the corresponding resource set is configured as described above. Meanwhile, for the resource set which is set to enable the FDM transmission of the PDSCH, the decoding may be performed on the assumption that the PDSCH transmission is performed on the remaining REs other than the RE in which Non-zero power CSI-RS or Zero power CSI-RS transmission is performed.

TABLE 20

|  | Cell-specifically configured CSI-RS or PI BM | US-specifically configured CSI RS for P2 BM |
|---|---|---|
| Configuration method | MIB or SIB | RRC |
| Transmission period | Periodic, Semi-persistent | Periodic, Semi-persistent, Aperiodic |

TABLE 20-continued

| | Cell-specifically configured CSI-RS or PI BM | US-specifically configured CSI RS for P2 BM |
|---|---|---|
| Upon Semi-persistent transmission, Activation/ Deactivation method | Broadcasting whether each resource set is activated in SIB using bitmap as many ast he number resource sets configured in cell | Transmitting whether each resource is activated in RRC or MAC CE using bitmap as many as the number of resource sets configured in terminal |
| Sub-time unit order setting method | Disable | In case of Periodic or semi persistent transmission, RRC or MAC CE can be used In case of Aperiodic transmission, RRC, MAC CE, or DCI can be used |
| QCL Indication | QCL information with SS-bock | Option 1, QCL information with SS-block Option 2, QCL information with Cell-specifically configured CSI-RS resource set |

TABLE 21

| | Cell-specifically configured CSI-RS or PI BM | US-specifically configured CSI RS for P2 BM |
|---|---|---|
| Configuration method | RRC | |
| Transmission period | Periodic, Semi-persistent | Periodic, Semi-persistent, Aperiodic |
| Upon Semi-persistent transmission, Activation/ Deactivation method | Transmitting whether each resource is activated in RRC or MAC CE using bitmap as many as the number of resource sets configured in terminal | |
| Sub-time unit order setting method | Disable | In case of Periodic or semi-persistent transmission. RRC or MAC CE can be used In case of Aperiodic transmission, RRC, MAC CE, or DCI can be used |
| QCL Indication | QCL information with SS-bock | Option 1, QCL information with SS-block Option 2, QCL information with resource set for "UE-specifically configured CSI-RS for P1 BM" resource set |

Sixth Embodiment: RE Mapping Method of CSI-RS for Beam Management

According to the CSI-RS setting method proposed in the disclosure, one CSI-RS resource (or port group) may be allocated to one OFDM symbol.

Figure 32:
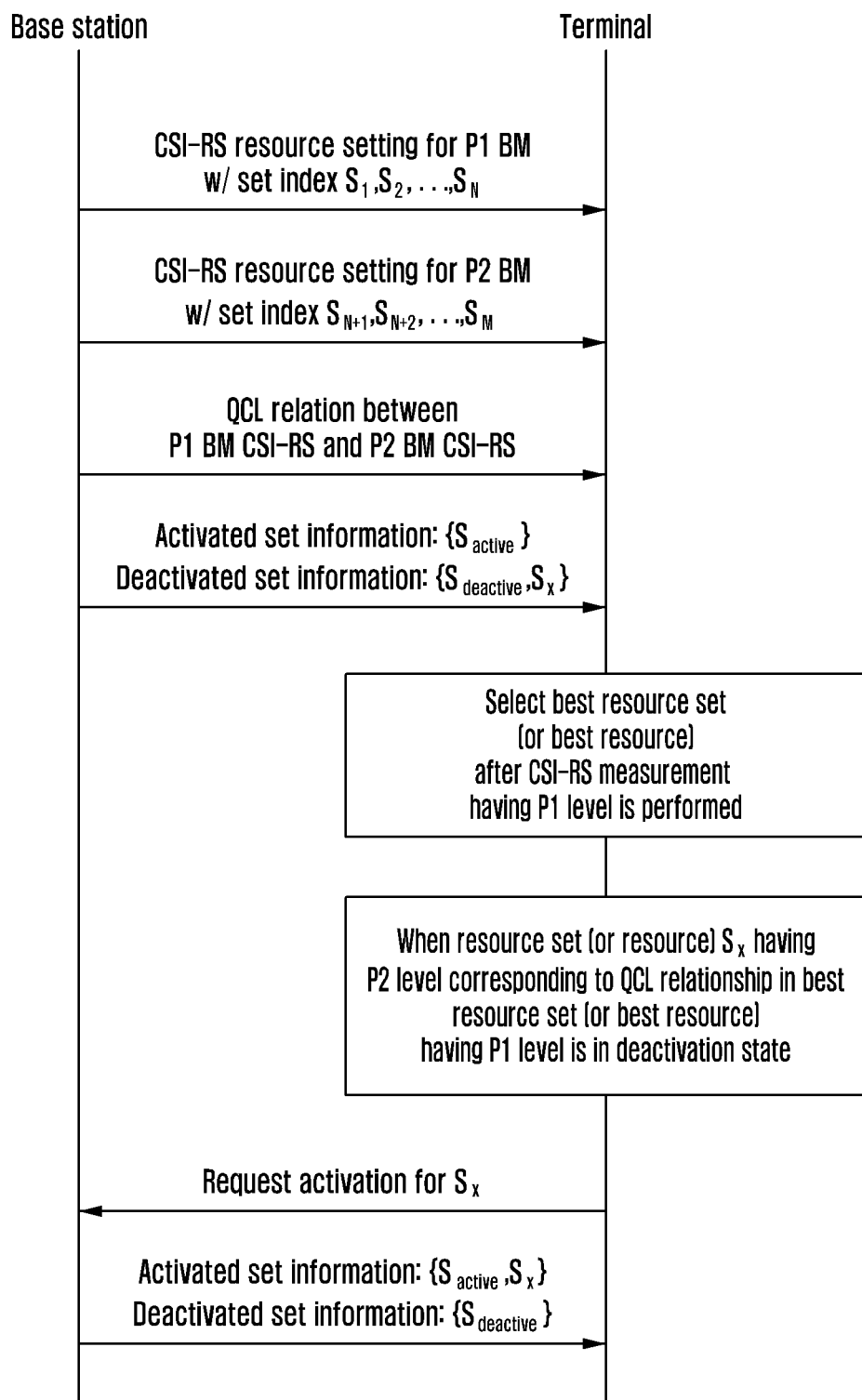
FIG. 32 is a diagram illustrating a CSI-RS resource setting between a base station and a terminal according to an embodiment of the disclosure.

FIG. 32 is a diagram illustrating a CSI-RS resource setting between a base station and a terminal according to an embodiment of the disclosure.

Figure 33:
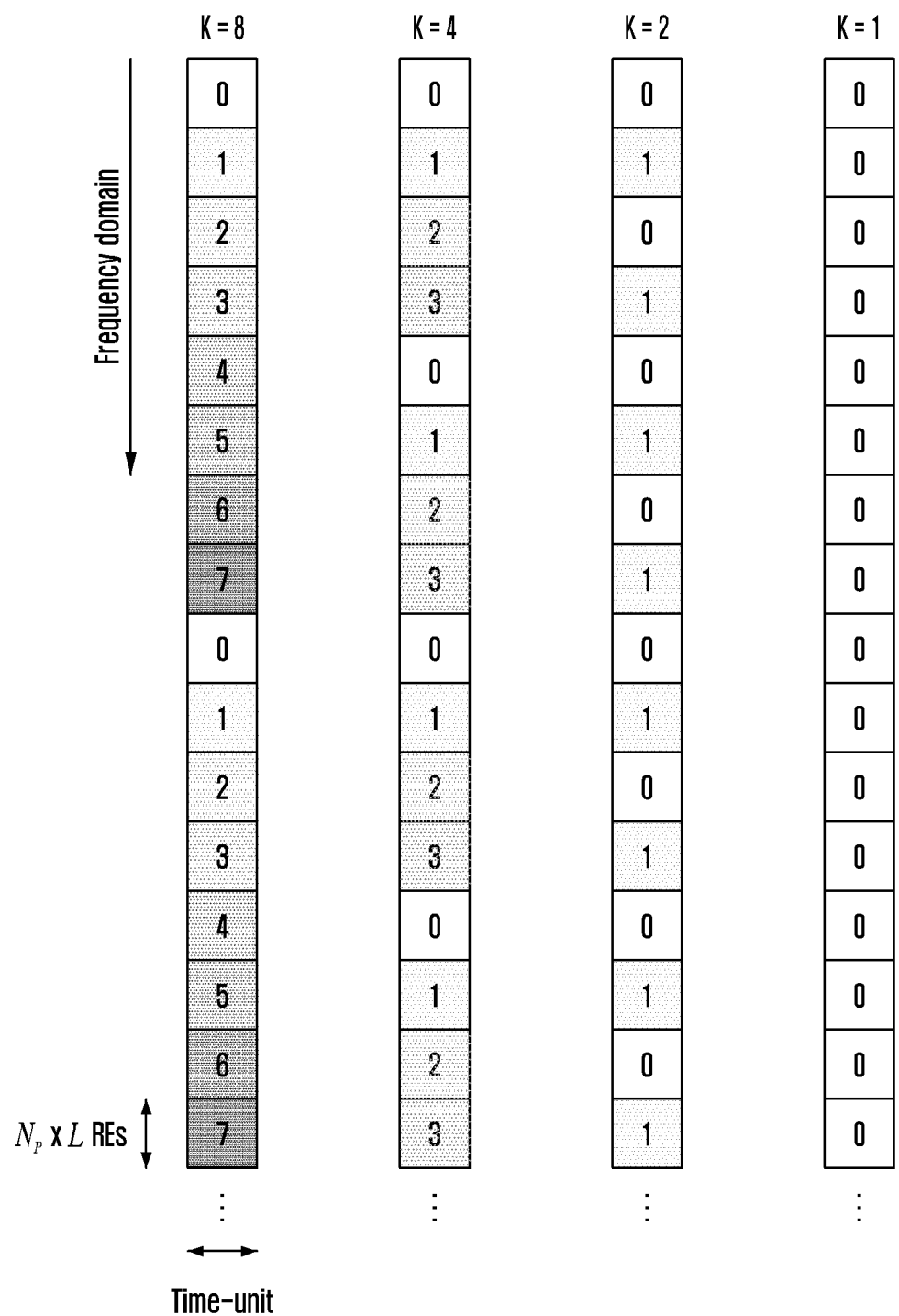
FIG. 33 is a diagram illustrating a case in which K CSI-RS resources (or port groups) are allocated to one OFDM symbol according to an embodiment of the disclosure.

FIG. 33 is a diagram illustrating a case in which K CSI-RS resources (or port groups) are allocated to one OFDM symbol according to an embodiment of the disclosure.

Referring to FIGS. 32 and 33, an embodiment for a case in which K=1, 2, 4, and 8. K resources (or port groups) are sequentially and repeatedly mapped to one OFDM symbol on frequency is illustrated. The OFDM symbol length in which one CSI-RS is transmitted is referred to as a time unit, and the length of the time unit is determined by a fs value set by the base station as described above.

Figure 34:
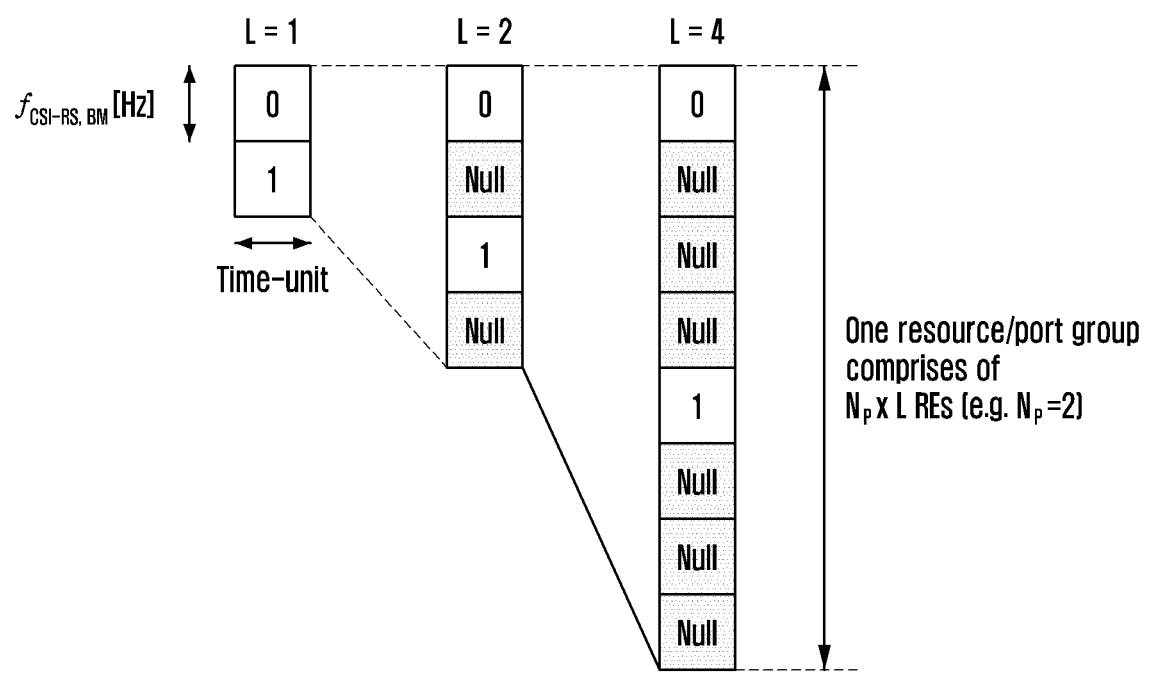
FIG. 34 is a diagram illustrating a case in which one resource or a port group is mapped to NP×L Res according to an embodiment of the disclosure.

FIG. 34 is a diagram illustrating a case in which one resource or port group is mapped to NP×L REs according to an embodiment of the disclosure.

Referring to FIG. 34, one resource or port group is mapped to $N_P \times L$ REs, which is illustrated in FIG. 34. Here, a value indicated by $f_{CSI-RS, BM}$ has the same meaning as $f_s$ described above, but only notation is represented differently. $N_P$ means the number of antenna ports that may be included in one resource (or port group), and L means the number of sub-time units that may be set in one time unit. As described above, the terminal may perform the Rx beam sweeping up to L times within one time unit.

For the RE mapping of the CSI-RS for the beam management, the same method as the following Table 27 may be used. This corresponds to the case in which K=1 in the above embodiment.

TABLE 27

CSI-RS resource with 1-port and 2-port for one OFDM symbol
may be used for beam management
   For the case of 1-port
No CDM
Subcarrier spacing within a PRB for D>1
   Even spacing L
Constant subcarrier spacing across PRB(s)
   Constant subcarrier spacing within a BWP
FFS the values of D
For the case of 2-port:
No CDM
Subcarrier spacing within a PRB for D>1
Even spacing 2L between the same port
Even spacing L between different ports
Constant subcarrier spacing across PRB(s)
Constant subcarrier spacing within a BWP
FFS the values of D The RE mapping for the non-zero power CSI-RS (NZP CSI-RS) for the specific OFDM symbol may be set as shown in the following Table 27. The above setting may be performed as shown in the following Table 28. The setting may include time base information "Symbol_location_info" and "Slot_location_info" on a symbol and a slot to which K resources are transmitted. If the K resources are periodic or semi-persistent CSI-RS, the setting may include a parameter "Periodicity" associated with the transmission period. If the K resources are periodic or aperiodic CSI-RS, the setting may not include the value for the parameter "Periodicity". For the setting of the RE mapping method for the K resources, the setting may include a field "nzp_resourceConfig". The field may include a parameter K [resources] for indicating how many resources are transmitted at the set symbol location. The field may include a value for a parameter X [ports] indicating how many antenna ports the resources are configured. At this time, each of the K resources may consist of resources having X [ports]. The field may include a value for D [REs/RB/port] to set a density for one antenna port. For example, each of the antenna ports included in the K resources are transmitted at a symbol location set at a density of D. In the case of X=1 [port], the value D may be represented by D=12/(LK) [RE/RB/port] based on parameters illustrated in FIGS. 33 and 34. For any X=[port] value, the value D may be represented by D=12/(LXK) [RE/RB/port] based on the parameters illustrated in FIGS. 33 and 34. The field may include an RE_mapping_offset [REs] parameter, which includes the information on the RE position at which the RE mapping for the K resources starts. For example, for a total of M PRBs corresponding to PRB index "I" to PRB index "I+M?1", if the K resources are transmitted while being RE mapped as shown in FIGS. 33 and 34, the location at which the RE mapping starts is RE_mapping_offset [REs]-th RE in the PRB corresponding to the PRB index I. For example, when the RE_mapping_offset values are set differently in different CSI-RS settings and all the remaining parameters are equally set, locations at which the CSI-RSs transmitted at each setting are RE mapped may be made not to overlap with each other. In this case, the RE_mapping_off value is 0, 1, . . . , L−1 based on the parameter L value of FIG. 34.

TABLE 28

```
CSI-RS-ConfigNZP-BM = {
   Symbol_location_info= { }
   Slot_location_info = { }
   Periodicity = { }
   nzp-resourceConfig = {
D = { },
K = { },
X = { },
RE_mapping_offset = { }
}
}
```

The base station may allocate zero power CSI-RS (ZP CSI-RS) resources to the remaining REs other than the REs corresponding to the RE mapping of the NZP CSI-RS resource. The base station may notify the terminal whether the ZP CSI-RS resource is set in the remaining RE when setting the NZP CSI-RS resource. The setting of the resource may be performed as shown in Table 29. The "nzp-resourceConfig" field sets the RE position corresponding to one or more NZP CSI-RS resource (s). The "zp-resourceConfig" field is a field for setting whether the ZP CSI-RS resource corresponds to the RE positions other than the RE positions corresponding to the NZP CSI-RS resource (s). For example, when "zp-resourceConfig={On}", the one ZP CSI-RS resource is set to correspond to the remaining RE positions.

TABLE 29

```
CSI-RS-Config-BM = {
Symbol_location_info = { }
   Slot_location_info = { }
   Periodicity = { }
   nzp-resourceConfig= {
D = { },
K = { },
X = { },
RE_mapping_offset = { }
}
   zp-resourceConfig= {On, Off}
}
```

If the base station simultaneously sets the ZP CSI-RS and the NZP CSI-RS in the terminal using the following Table 29, the terminal may be assumed that a time domain repeating pattern appears L times in the OFDM symbol interval.

Figure 36:
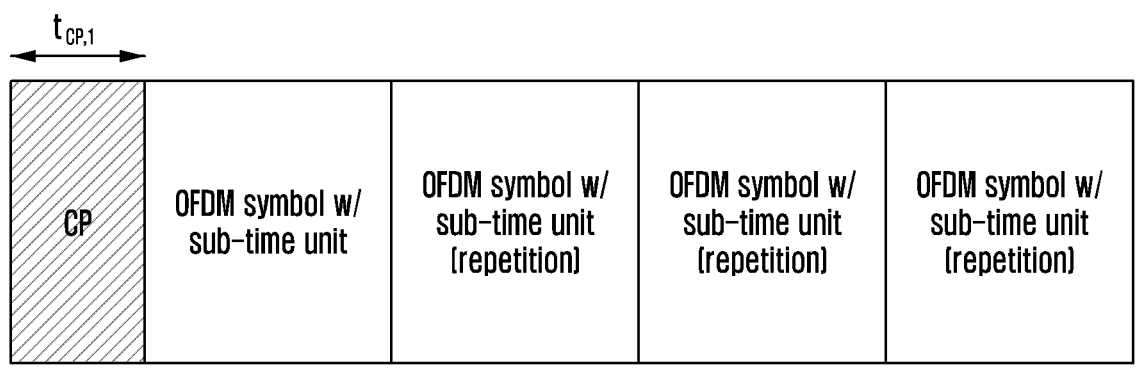
FIG. 36 is a diagram illustrating a case in which L=4 sub-time unit OFDM symbols are generated within one OFDM symbol interval according to an embodiment of the disclosure.

FIG. 36 is a diagram illustrating a case in which L=4 sub-time unit OFDM symbols are generated within one OFDM symbol interval according to an embodiment of the disclosure.

Referring to FIG. 36, when the related parameter is set to be L=4 in the following Table 27, if the CSI-RS is set in the terminal using the method 2, the terminal sets a sub-time unit OFDM symbol having L=4 in one OFDM symbol interval. The terminal may apply different terminal reception beams for each sub-time unit and may search for an optimal terminal reception beam by comparing the received strength for each sub time unit.

According to the CSI-RS setting method proposed in the disclosure, a plurality of resource sets may be set in one OFDM symbol as described above. In the disclosure, the term resource group may be replaced by another expression having the same meaning as the resource set described above.

Figure 35:
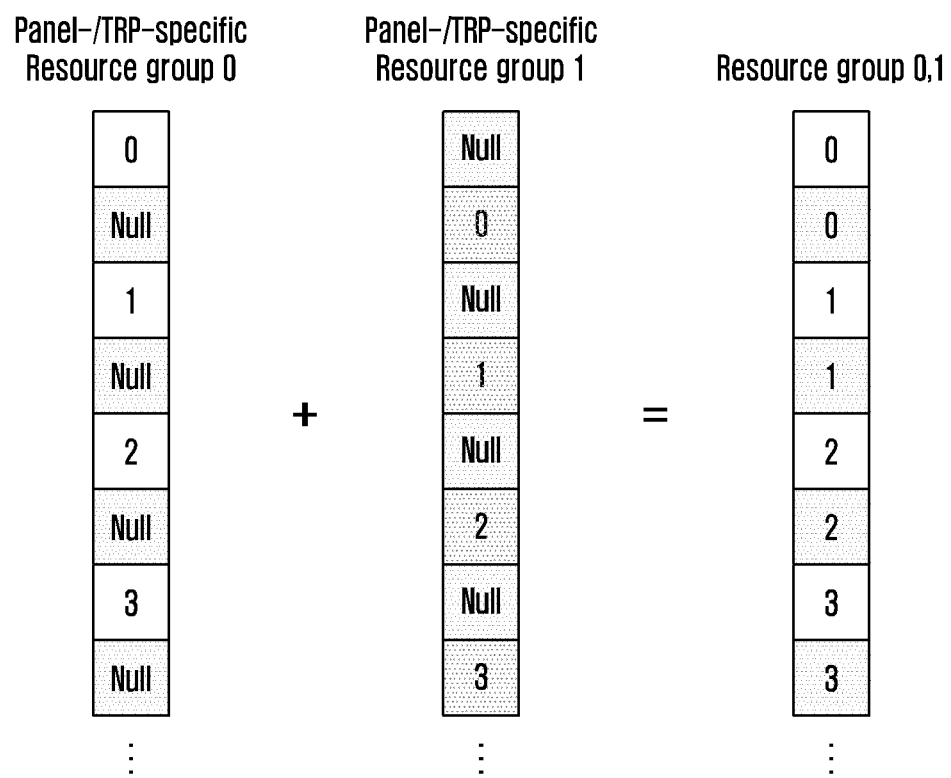
FIG. 35 is a diagram illustrating an embodiment of a case in which two resource groups are set in one OFDM symbol according to an embodiment of the disclosure.

FIG. 35 is a diagram illustrating an embodiment of a case in which two resource groups are set in one OFDM symbol according to an embodiment of the disclosure. Each resource group may be transmitted from a different base station antenna panel or TRP.

Referring to FIG. 35, according to another embodiment of the disclosure, the resource setting of the CSI-RS having K resources in one OFDM symbol may be set as follows. The following setting may be equally applied to several OFDM symbols. At this time, the setting described below as shown in the following Table 31 may further include the information on the OFDM symbol location and the slot location.

The following Table 30 shows the methods for setting the K CSI-RS resources in one OFDM symbol based on the RE mapping method for the single antenna port described in the following Table 27. The value of D [REs/RB/port] indicating the density at which one antenna port is RE mapped on the frequency base is determined according to the configuration index value, and the K value as the number of resources to be set in one OFDM symbol is determined. In order to prevent the collision of the RE-mapped locations on the frequency base between the K resources, different RE mapping offset ($\delta_k$) for each resource are determined based on values in the following Table 30. For example, according to Configuration index No. 0, K=2 resources are set in one OFDM symbol. In the bandwidth in which the CSI-RS is set, a first resource means that the RE mapping starts from RE No. 0, and a second resource means that the RE mapping starts from RE No. 1. Since the above parameters are automatically determined when only the Configuration index value is given, it is sufficient to include only the Configuration index value in the CSI-RS resource setting.

Meanwhile, all of the K resources may be set as the non-zero power (NZP) CSI-RS, and some thereof may be set as zero power (ZP) CSI-RS. In order to increase the accuracy of L1-RSRP measurement in a serving cell and facilitate measurement for the interference of neighboring cells, the allocation pattern of the NZP CSI-RS and ZP CSI-RS between cells may not overlap each other. As the method, a bitmap "$b_0 b_1 \ldots b_{K-1}$" having a length K may be included in the CSI-RS resource setting. If bk is set to be "1" in the bitmap, the (k+1)-th resource set in the CSI-RS resource setting is set to be the NZP CSI-RS. If bk is set to be "0" in the bitmap, the (k+1)-th resource set in the CSI-RS resource setting is set to be the ZP CSI-RS.

The CSI-RS resource setting may be equally set in different terminals. The CSI-RS may be set as the SP CSI-RS, and only some resources thereof may be UE-specifically activated.

Table 30: Configuration for K SP CSI-RS resources with single antenna port (Type-1)

TABLE 30

| Configuration index[1] | D [REs/RB/port] | Number of antenna ports per resource (X) | Number of configured resources on one OFDM symbol (K) | RE mapping offset for each resource |
| --- | --- | --- | --- | --- |
| 0 | 6 | 1 | 2 | 0, 1 |
| 1 | 3 | 1 | 4 | 0, 1, 2, 3 |

TABLE 30-continued

| Configuration index[1] | D [REs/RB/port] | Number of antenna ports per resource (X) | Number of configured resources on one OFDM symbol (K) | RE mapping offset for each resource |
|---|---|---|---|---|
| 2 | 1.5 | 1 | 8 | 0, 1, 2, 3, 4, 5, 6, 7 |
| 3-7 | Reserved | Reserved | Reserved | Reserved |

(1) Need to be Included in the CSI-RS Resource Setting

The above embodiment may be used as the setting method for P CSI-RS or AP CSI-RS in which the periodic transmission is performed. For example, the resource setting of the CSI-RS may be performed as shown in the following Table 31.

TABLE 31

```
CSI-RS-Config-BM = {
   Symbol_location_info = { }
   Slot_location_info = { }
   Periodicity = { }
   nzp-resourceConfig = {
      Configuration index = { },
   }
   zp-resourceConfig = b₀b₁...b_{K-1}
}
```

According to another embodiment of the disclosure, in the resource setting of the CSI-RS having K resources in one OFDM symbol, values of each D, K, and $\delta_k$ may be set as shown in the following Table 32. Unlike the above Table 30, in the setting related to the following Table 32, values for Configuration index (or D), K, X, and $\delta_k$ should be specifically included at the time of the resource setting of CSI-RS. At this time, the REs that are not used for the RE mapping for the K resources may be generated in the OFDM symbol in which the CSI-RS is set according to which value K is set to be. The resource setting of the CSI-RS may include a "zp-resourceConfig" field that may be represented by 1 bit. If the value of this field is set to be "On", the terminal may assume that the ZP CSI-RS is set for the REs not used for the RE mapping of the K resources. On the other hand, if the value of this field is set to be "OFF", it means that the terminal should not make any assumption about the REs not used in the RE mapping of the K resources.

TABLE 32

Configuration for K P/AP CSI-RS resources with single antenna port (Type-2)

| Configuration index[1] | D [REs/RB/port] | Number of antenna ports per resource (X) | Number of configured resources on one OFDM symbol[1] (K) | RE mapping offset for each resource[1] ($\delta_k$) |
|---|---|---|---|---|
| 0 | 6 | 1 | K = {1, 2} | $\delta_k$ = {0, 1} |
| 1 | 3 | 1 | K = {1, 2, 4} | $\delta_k$ = {0, 1, 2, 3} |
| 2 | 1.5 | 1 | K = {1, 2, 4, 8} | $\delta_k$ = {0, 1, 2, 3, 4, 5, 6, 7} |
| 3-7 | Reserved | Reserved | Reserved | Reserved |

(1) Need to be Included in the CSI-RS Resource Setting

The above embodiment may be used as the setting method of the AP CSI-RS in which the periodic transmission is performed. For example, the resource setting of the CSI-RS may be performed as shown in the following Table 33. The following setting may be equally applied to several OFDM symbols. At this time, the setting described below as shown in the following Table 33 may further include the information on the OFDM symbol location.

TABLE 33

```
CSI-RS-Config-BM = {
   Symbol_location_info = { }
   nzp-resourceConfig = {
      Configuration index[1] = { }
      Number_Antenna_Ports (X) = { }
      Number of resources on one OFDM symbol (K) = { }
      RE_mapping_offset = { $\delta_0$, $\delta_1$, ..., $\delta_{K-1}$ }
   }
   zp-resourceConfig = {On, Off}
}
```

(1) Replaced by D [REs/RB/Port] Parameter

According to another embodiment of the disclosure, in the resource setting of the CSI-RS having K resources in one OFDM symbol, the parameters shown in the following 34 may be used. The resource setting of the CSI-RS may be performed as shown in the following Table 35. For example, if only the value for the "Configuration index" is instructed to the terminal, the terminal may find the values for the remaining parameters D, X, K, and δk based on the following Table 34.

TABLE 34

| Configuration index[1] | D [REs/RB/port] | Number of antenna ports per resource (X) | Number of configured resources on one OFDM symbol (K) | RE mapping offset for each resource ($\delta_k$) |
|---|---|---|---|---|
| 0 | 6 | 1 | K = 1 | $\delta_0$ = 0 |
| 1 | | | | $\delta_0$ = 1 |
| 2 | | | K = 2 | $\delta_0$ = k for k = 0, 1 |
| 3 | 3 | | | |
| 4 | | | K = 1 | $\delta_0$ = 0 |
| 5 | | | | $\delta_0$ = 1 |
| 6 | | | | $\delta_0$ = 2 |
| | | | | $\delta_0$ = 3 |
| 7 | | | K = 2 | $\delta_0$ = 0, $\delta_1$ = 2 |
| 8 | | | | $\delta_0$ = 1, $\delta_1$ = 3 |
| 9 | | | K = 4 | $\delta_k$ = k for k = 0, 1, 2, 3 |
| 10 | 1.5 | | K = 1 | $\delta_0$ = 0 |
| 11 | | | | $\delta_0$ = 1 |
| 12 | | | | $\delta_0$ = 2 |
| 13 | | | | $\delta_0$ = 3 |
| 14 | | | | $\delta_0$ = 4 |
| 15 | | | | $\delta_0$ = 5 |
| 16 | | | | $\delta_0$ = 6 |
| 17 | | | | $\delta_0$ = 7 |
| 18 | | | | K = 2 | $\delta_0$ = 0, $\delta_1$ = 4 |
| 19 | | | | $\delta_0$ = 1, $\delta_1$ = 5 |
| 20 | | | | $\delta_0$ = 2, $\delta_1$ = 6 |
| 21 | | | | $\delta_0$ = 3, $\delta_1$ = 7 |
| 22 | | | K = 4 | $\delta_0$ = 0, $\delta_1$ = 2, $\delta_2$ = 4, $\delta_3$ = 6 |
| 23 | | | | $\delta_0$ = 1, $\delta_1$ = 3, $\delta_2$ = 5, $\delta_3$ = 7 |
| 24 | | | K = 8 | $\delta_k$ = k for k = 0, 1, ..., 7 |

TABLE 35

```
CSI-RS-Config-BM = {
  Symbol_location_info,
  Slot_location_info,
  Periodicity,
  nzp-resourceConfig = {
    Configuration index
  }
  zp-resourceConfig = {On, Off}
}
```

Meanwhile, in the above embodiments of the disclosure, the "Slot_location_info" field included in the resource settings related to the P/SP CSI-RS in which the periodic transmission is performed transmits to the terminal the location information of the slots through which the CSI-RS set in the resource setting. The "Slot_location_info" field may be configured as shown in the following Table 36. For example, the start location at which the slots are allocated is indicated as "Starting_slot_index", and the number of slots continuously allocated from the start location may be indicated as "Number_of_consecutive_Slots". For example, in the case of the following Table 36, the CSI-RSs set in the resource setting are transmitted in Y consecutive slots starting from a X-th slot location.

TABLE 36

```
Slot_location_info = {
Starting_slot_index = X
Number_of_consecutive_Slots = Y
}
```

Meanwhile, the setting of the slot location may be performed as shown in the following Table 37. For example, for the Y consecutive slots from the X-th slot location, the "Configured_Slots" field may specifically indicate the slot location at which the CSI-RS is to be transmitted through the bit map having the Y length. For example, when bi is "1", a location of a "X+i"-th slot indicates the slot used for the transmission of the CSI-RS. When bi is "0", the location of the "X+i"-th slot indicates the terminal that the slot used for the transmission of the CSI-RS.

TABLE 37

```
Slot_location_info = {
Starting_slot_index = X
Configured_Slots = b0b1...bY
}
```

In the above embodiments of the disclosure, the "Symbol_location_info" field included in the resource setting transmits to the terminal the location information of the OFDM symbol to which the CSI-RS is transmitted in the slots indicated by the resource setting. For example, the slots correspond to the slots indicated by, for example, the method as shown in the above Table 36 or Table 37, and for all the slots, the CSI-RS is commonly transmitted at the OFDM symbol location indicated by the "Symbol_location_info" field. Meanwhile, in the case of the AP CSI-RS in which the aperiodic transmission is performed, the DCI indicating the transmission of the AP CSI-RS may explicitly transmit the slot location at which the AP CSI-RS is transmitted.

The information transmitted in the "Symbol_location_info" field may consist of bitmap b0b1 . . . b13 having a length of 14 as shown in the following Table 38, for example. If the bi bit in the bitmap is set to be "1", it indicates to the terminal that the i-th OFDM symbol in the slots is used for the CSI-RS transmission. If the bi bit in the bitmap is set to be "0", it indicates to the terminal that the i-th OFDM symbol in the slots is not used for the CSI-RS transmission.

TABLE 38

Symbol_location_info = {$b_0 b_1 ... b_{13}$}

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a base station, channel state information reference signal (CSI-RS) resource information, the CSI-RS resource information including a repetition indicator indicating whether a repetition is on or off for a CSI-RS resource set; and
   measuring CSI-RSs corresponding to CSI-RS resources within the CSI-RS resource set based on the CSI-RS resource information,
   wherein the UE assumes that the CSI-RS resources within the CSI-RS resource set are received with a same transmission beam of the base station in case that the repetition indicator is set to on, and
   wherein the CSI-RS resources within the CSI-RS resource set are received in different OFDM symbols.

2. The method of claim 1, wherein the CSI-RS resource information includes at least one of a synchronization sequence (SS) block index having spatially quasi-co-location (QCL) relationship with the CSI-RS resource set, resource allocation information for the CSI-RS resource set, and a transmission period for the CSI-RS resource set.

3. The method of claim 1,
   wherein the UE assumes that the CSI-RS resources within the CSI-RS resource set are received with different transmission beams of the base station in the different OFDM symbols in case that the repetition indicator is set to off.

4. The method of claim 3, further comprising:
   obtaining a reference signal received power (RSRP) based on a measurement of the CSI-RSs,
   wherein the CSI-RS resource set is configured for a beam management.

5. The method of claim 1, wherein the CSI-RS resource information is received via a radio resource control (RRC) message.

6. A method performed by a base station in a wireless communication system, the method comprising:
   transmitting, to a user equipment (UE), channel state information reference signal (CSI-RS) resource information, the CSI-RS resource information including a repetition indicator indicating whether a repetition is on or off for a CSI-RS resource set; and
   transmitting, to the UE, CSI-RSs corresponding to CSI-RS resources within the CSI-RS resource set based on the CSI-RS resource information,
   wherein the CSI-RS resources within the CSI-RS resource set are transmitted with a same transmission beam of the base station in case that the repetition indicator is set to on, and wherein the CSI-RS resources within the CSI-RS resource set are transmitted in different OFDM symbols.

7. The method of claim 6, wherein the CSI-RS resource information includes at least one of a synchronization sequence (SS) block index having spatially quasi-co-location (QCL) relationship with the CSI-RS resource set, resource allocation information for the CSI-RS resource set, and a transmission period for the CSI-RS resource set.

8. The method of claim 6,
wherein the CSI-RS resources within the CSI-RS resource set are transmitted with different transmission beams of the base station in the different OFDM symbols in case that the repetition indicator is set to off.

9. The method of claim 8,
wherein a reference signal received power (RSRP) is obtained based on a measurement of the CSI-RSs, and
wherein the CSI-RS resource set is configured for a beam management.

10. The method of claim 6, wherein the CSI-RS resource information is transmitted via a radio resource control (RRC) message.

11. A user equipment (UE) in a wireless communication system, the UE comprising:
a transceiver; and
a controller configured to:
receive, from a base station via the transceiver, channel state information reference signal (CSI-RS) resource information, the CSI-RS resource information including a repetition indicator indicating whether a repetition is on or off for a CSI-RS resource set, and
measure CSI-RSs corresponding to CSI-RS resources within the CSI-RS resource set based on the CSI-RS resource information,
wherein the UE assumes that the CSI-RS resources within the CSI-RS resource set are received with a same transmission beam of the base station in case that the repetition indicator is set to on, and
wherein the CSI-RS resources within the CSI-RS resource set are received in different OFDM symbols.

12. The UE of claim 11, wherein the CSI-RS resource information includes at least one of a synchronization sequence (SS) block index having spatially quasi-co-location (QCL) relationship with the CSI-RS resource set, resource allocation information for the CSI-RS resource set, and a transmission period for the CSI-RS resource set.

13. The UE of claim 11, wherein of the UE assumes that the CSI-RS resources within the CSI-RS resource set are received with different transmission beams of the base station in the OFDM symbols in case that the repetition indicator is set to off.

14. The UE of claim 13,
wherein the controller is configured to obtain a reference signal received power (RSRP) based on a measurement of the CSI-RSs, and
wherein the CSI-RS resource set is configured for a beam management.

15. The UE of claim 11, wherein the CSI-RS resource information is received via a radio resource control (RRC) message.

16. A base station in a wireless communication system, the base station comprising:
a transceiver; and
a controller configured to:
transmit, to a user equipment (UE) via the transceiver, channel state information reference signal (CSI-RS) resource information, the CSI-RS resource information including a repetition indicator indicating whether a repetition is on or off for a CSI-RS resource set, and
transmit, to the UE via the transceiver, CSI-RSs corresponding to CSI-RS resources within the CSI-RS resource set based on the CSI-RS resource information,
wherein the CSI-RS resources within the CSI-RS resource set are transmitted with a same transmission beam of the base station in case that the repetition indicator is set to on, and
wherein the CSI-RS resources within the CSI-RS resource set are transmitted in different OFDM symbols.

17. The base station of claim 16, wherein the CSI-RS resource information includes at least one of a synchronization sequence (SS) block index having spatially quasi-co-location (QCL) relationship with the CSI-RS resource set, resource allocation information for the CSI-RS resource set, and a transmission period for the CSI-RS resource set.

18. The base station of claim 16, wherein transmission of the CSI-RS resources within the CSI-RS resource set are transmitted with different transmission beams of the base station in the OFDM symbols in case that the repetition indicator is set to off.

19. The base station of claim 18,
wherein a reference signal received power (RSRP) is obtained based on a measurement of the CSI-RSs, and
wherein the CSI-RS resource set is configured for a beam management.

20. The base station of claim 16, wherein the CSI-RS resource information is transmitted via a radio resource control (RRC) message.

* * * * *